US012718746B2

(12) United States Patent
Kim et al.

(10) Patent No.: US 12,718,746 B2
(45) Date of Patent: Aug. 25, 2026

(54) GATE DRIVER AND ELECTRONIC APPARATUS INCLUDING THE GATE DRIVER

(71) Applicant: SAMSUNG DISPLAY CO., LTD., Yongin-si (KR)

(72) Inventors: Kyungho Kim, Yongin-si (KR); Sang Yong No, Yongin-si (KR); Nahyeon Cha, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 19/074,631

(22) Filed: Mar. 10, 2025

(65) Prior Publication Data

US 2026/0004715 A1 Jan. 1, 2026

(30) Foreign Application Priority Data

Jun. 26, 2024 (KR) ........................ 10-2024-0083462
Jul. 29, 2024 (KR) ........................ 10-2024-0100459

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/0267* (2013.01); *G09G 2310/0275* (2013.01); *G09G 2310/0289* (2013.01); *G09G 2310/08* (2013.01); *G09G 2330/021* (2013.01)

(58) Field of Classification Search
None
See application file for complete search history.

(56) References Cited

FOREIGN PATENT DOCUMENTS

| | | | | | |
|---|---|---|---|---|---|
| JP | H11202290 | A | * | 7/1999 | |
| KR | 20050121357 | A | * | 12/2005 | |
| KR | 10-2016-0122907 | A | | 10/2016 | |
| KR | 20180098193 | A | * | 9/2018 | ............. G11C 19/28 |
| KR | 10-2471098 | B1 | | 11/2022 | |
| KR | 10-2023-0046918 | A | | 4/2023 | |

* cited by examiner

*Primary Examiner* — Kirk W Hermann

(74) *Attorney, Agent, or Firm* — F. CHAU & ASSOCIATES, LLC

(57) ABSTRACT

A gate driver includes stages. Each of the stages includes a first transistor transmitting an input signal to a control node, a second transistor outputting a high gate voltage as a gate signal in response to a signal of an inverting control node, a third transistor outputting a first low gate voltage as the gate signal in response to a signal of the control node, a level shifter configured to transfer the high gate voltage or a third low gate voltage to the control node and the inverting control node in response to a signal of the control node and the signal of the inverting control node, a fourth transistor transmitting a previous carry signal to the inverting control node, and a fifth transistor outputting the high gate voltage or the third low gate voltage as a carry signal in response to the signal of the control node.

20 Claims, 15 Drawing Sheets

(COMPARATIVE EXAMPLE)

(COMPARATIVE EXAMPLE)

GATE DRIVER AND ELECTRONIC APPARATUS INCLUDING THE GATE DRIVER

CROSS-REFERENCE TO RELATED APPLICATION(S)

This application claims priority under 35 USC § 119 to Korean Patent Application No. 10-2024-0083462 filed on Jun. 26, 2024 and Korean Patent Application No. 10-2024-0100459 filed on Jul. 29, 2024, in the Korean Intellectual Property Office (KIPO), the entire disclosure of which is incorporated by reference herein.

FIELD

Embodiments relate to a display device. More particularly, embodiments relate to a gate driver with low power consumption, a display device including the gate driver, and an electronic apparatus including the display device.

DISCUSSION OF RELATED ART

A display device may include a display panel for displaying an image, a gate driver for providing gate signals to the display panel, and a data driver for providing data voltages to the display panel. The gate driver may include a plurality of stages for generating the gate signals.

A clock signal may be applied to a stage, and a control node signal at a control node of the stage may change in response to the clock signal. The gate signal output by the stage may change in response to the control node signal.

However, when a rising transition (a transition from a low voltage state to a high voltage state, e.g., a rise time) or a falling transition (e.g., a fall time) of the control node signal is too slow, a rising or falling transition of the gate signal may also be too slow. As a result, reliability of the gate driver may deteriorate.

SUMMARY

Embodiments of the present disclosure may provide a gate driver with improved reliability.

Embodiments of the present disclosure may provide a display device including a gate driver with improved reliability and an electronic apparatus (electronic device) including the display device.

In a gate driver including a plurality of stages according to embodiments, each of the stages includes a first transistor configured to transfer an input signal to a first control node in response to a clock signal, a second transistor configured to output a high gate voltage as a gate signal in response to a signal of an inverting control node, a third transistor configured to output a first low gate voltage as the gate signal in response to a signal of a second control node, a level shifter configured to transfer the high gate voltage or a third low gate voltage to the first control node and the inverting control node in response to a signal of the first control node, the signal of the second control node, and the signal of the inverting control node, a fourth transistor configured to transfer a previous carry signal of a previous stage to the inverting control node in response to the clock signal, and a fifth transistor configured to output the high gate voltage or the third low gate voltage as a carry signal in response to the signal of the first control node or the signal of the second control node.

In an embodiment, an amplitude of the clock signal may be less than an amplitude of the signal of the first control node, an amplitude of the signal of the second control node, and an amplitude of the signal of the inverting control node.

In an embodiment, a level of a low voltage of the clock signal may be higher than a level of the first low gate voltage.

In an embodiment, a level of the third low gate voltage may be less than or equal to a level of the first low gate voltage.

In an embodiment, each of the stages may further include a ninth transistor including a gate that receives the third low gate voltage, a first terminal connected to the first control node, and a second terminal connected to the second control node.

In an embodiment, each of the stages may further include a first capacitor including a first terminal connected to an output terminal configured to output the gate signal and a second terminal connected to the second control node.

In an embodiment, each of the stages may further include a tenth transistor configured to transfer the high gate voltage or the third low gate voltage to the first control node or the second control node in response to a reset signal.

In an embodiment, the level shifter may include a sixth transistor configured to output the third low gate voltage to the inverting control node in response to the signal of the first control node, a seventh transistor configured to output the third low gate voltage to the first control node in response to the signal of the inverting control node, and an eighth transistor configured to output the high gate voltage to the first control node in response to the signal of the second control node.

In an embodiment, the sixth transistor may include a back gate which receives a second low gate voltage having a level lower than a level of the third low gate voltage.

In an embodiment, the sixth transistor may include a back gate connected to the second control node.

In an embodiment, the level shifter may further include an eleventh transistor including a gate which receives the third low gate voltage, a first terminal connected to the gate, and a second terminal connected to a first node, and a second capacitor including a first terminal connected to the first control node and a second terminal connected to the first node. The sixth transistor may include a back gate connected to the first node.

In an embodiment, the level shifter may include a sixth transistor configured to output the high gate voltage to the inverting control node in response to the signal of the first control node, a seventh transistor configured to output the high gate voltage to the first control node in response to the signal of the inverting control node, and an eighth transistor configured to output the third low gate voltage to the first control node in response to the signal of the second control node.

In an embodiment, the fifth transistor may include a gate connected to the first control node and a back gate connected to the second control node.

In a gate driver including a plurality of stages according to embodiments, each of the stages includes a first transistor configured to transfer an input signal to a first control node in response to a clock signal, a second transistor configured to output a high gate voltage as a gate signal in response to a signal of an inverting control node, a third transistor configured to output a first low gate voltage as the gate signal in response to a signal of a second control node, a level shifter configured to transfer the high gate voltage or a third low gate voltage to the first control node and the inverting control node in response to a signal of the first control node, the signal of the second control node, and the signal of the inverting control node, a fourth transistor configured to transfer a signal of a previous inverting control node of a previous stage to the inverting control node in response to the clock signal, and a fifth transistor configured to output the high gate voltage or the third low gate voltage to the inverting control node in response to the signal of the first control node or the signal of the second control node.

In an embodiment, an amplitude of the clock signal may be less than an amplitude of the signal of the first control node, an amplitude of the signal of the second control node, and an amplitude of the signal of the inverting control node.

In an embodiment, the level shifter may include a sixth transistor configured to output the third low gate voltage to the inverting control node in response to the signal of the first control node, a seventh transistor configured to output the third low gate voltage to the first control node in response to the signal of the inverting control node, and an eighth transistor configured to output the high gate voltage to the first control node in response to the signal of the second control node.

In an embodiment, the level shifter may include a sixth transistor configured to output the high gate voltage to the inverting control node in response to the signal of the first control node, a seventh transistor configured to output the high gate voltage to the first control node in response to the signal of the inverting control node, and an eighth transistor configured to output the third low gate voltage to the first control node in response to the signal of the second control node.

An electronic device according to embodiments includes a display device which displays an image, a processor which provides image data to the display device, and a power supply which provides power to the display device and the processor. The display device includes a display panel including a plurality of pixels, a gate driver including a plurality of stages which provide a plurality of gate signals to the pixels, and a data driver which provide a plurality of data voltages to the pixels. Each of the stages includes a first transistor configured to transfer an input signal to a first control node in response to a clock signal, a second transistor configured to output a high gate voltage as a gate signal of the gate signals in response to a signal of an inverting control node, a third transistor configured to output a first low gate voltage as the gate signal in response to a signal of a second control node, a level shifter configured to transfer the high gate voltage or a third low gate voltage to the first control node and the inverting control node in response to a signal of the first control node, the signal of the second control node, and the signal of the inverting control node, a fourth transistor configured to transfer a previous carry signal of a previous stage to the inverting control node in response to the clock signal, and a fifth transistor configured to output the high gate voltage or the third low gate voltage as a carry signal in response to the signal of the first control node or the signal of the second control node.

In an embodiment, each of the pixels may include a light-emitting element, a first pixel transistor which controls a driving current which flows to the light-emitting element, a second pixel transistor configured to transfer a data voltage of the data voltages to a gate of the first pixel transistor in response to a writing gate signal, a third pixel transistor which compensates a threshold voltage of the first pixel transistor in response to a compensation gate signal, a fourth pixel transistor configured to transfer a first initialization voltage to the gate of the first pixel transistor in response to an initialization gate signal, a fifth pixel transistor which blocks a connection between a first terminal of the first pixel transistor and a first power voltage in response to an emission signal, a sixth pixel transistor which blocks a connection between a second terminal of the first pixel transistor and a second power voltage in response to the emission signal, a seventh pixel transistor which provides a second initialization voltage to an anode of the light-emitting element in response to a bypass gate signal, and a storage capacitor which stores a signal of the gate of the first pixel transistor.

In an embodiment, the gate signal may be one of the compensation gate signal, the initialization gate signal, and the emission signal.

In the gate driver according to the embodiments, the previous carry signal (or the signal of the previous inverting control node) of the previous stage is transferred to the inverting control node of the stage, so that a fall time of the signal of the first control node may decrease. Accordingly, a fall time of the gate signal may decrease, and the reliability of the gate driver may be improved.

The display device according to the embodiments includes the gate driver with the improved reliability, so that display quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF EMBODIMENTS

Figure 1:
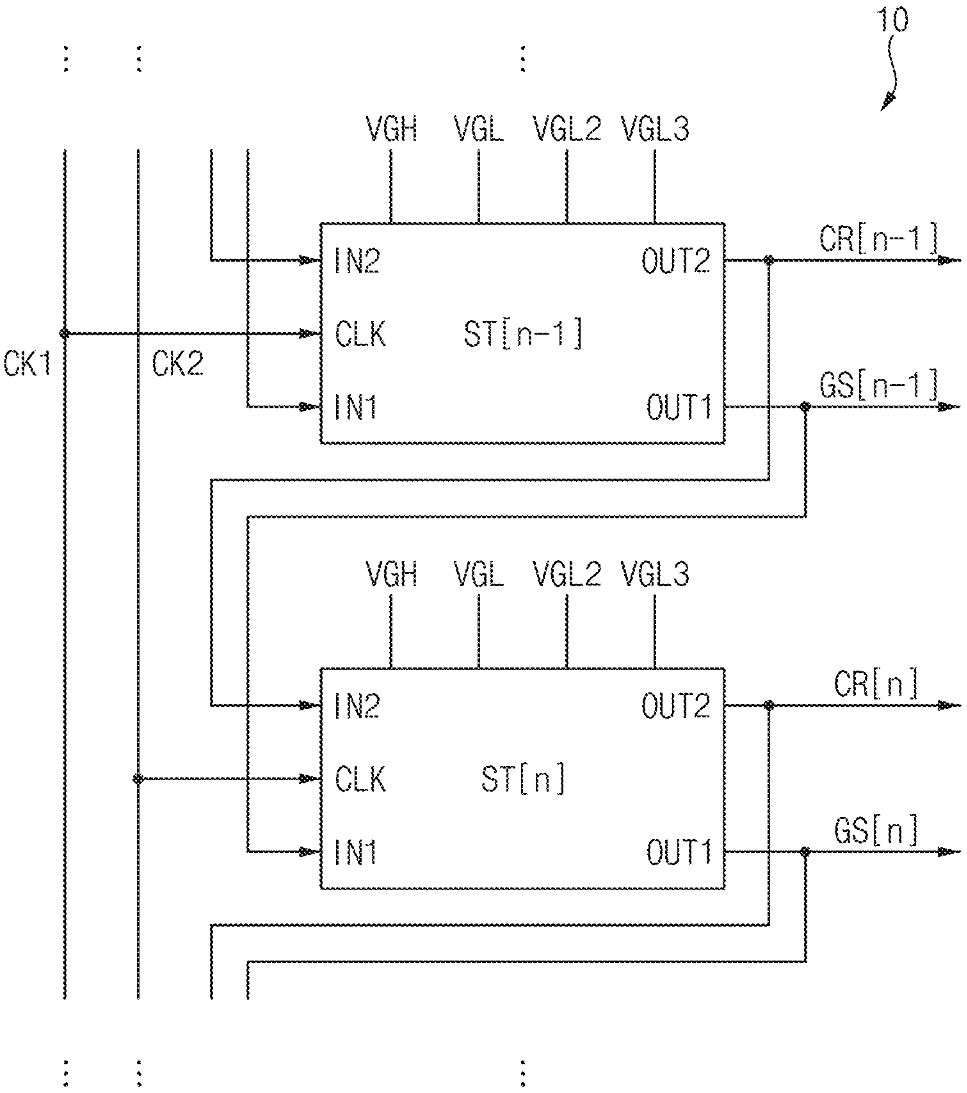
FIG. 1 is a block diagram showing a gate driver according to an embodiment.

Hereinafter, a gate driver, a display device, and an electronic apparatus according to embodiments of the present disclosure will be described in more detail with reference to the accompanying drawings. The same or similar reference numerals will be used for the same elements in the accompanying drawings.

FIG. 1 is a block diagram showing a gate driver 10 according to an embodiment.

Referring to FIG. 1, the gate driver 10 may receive a first clock signal CK1, a second clock signal CK2, a high gate voltage VGH, a first low gate voltage VGL, a second low gate voltage VGL2, a third low gate voltage VGL3, and a gate start signal (not shown), and may output a plurality of gate signals . . . , GS[n−1], GS[n], . . . (n is a natural number greater than 1) and a plurality of carry signals . . . , CR[n−1], CR[n], . . . .

The high gate voltage VGH may be both a gate-off voltage of a PMOS transistor and a gate-on voltage of an NMOS transistor. For example, a level of the high gate voltage VGH may be about 6.5 V. Each of the first low gate voltage VGL, the second low gate voltage VGL2, and the third low gate voltage VGL3 may be a gate-on voltage of a PMOS transistor and a gate-off voltage of an NMOS transistor. In an embodiment, a level of the third low gate voltage VGL3 may be less than or equal to a level of the first low gate voltage VGL. In an embodiment, a level of the second low gate voltage VGL2 may be less than the level of the third low gate voltage VGL3. For example, the level of the first low gate voltage VGL may be about −10 V.

Each of the first clock signal CK1 and the second clock signal CK2 may swing between a low voltage and a high voltage. A phase of the second clock signal CK2 may be different from a phase of the first clock signal CK1. The second clock signal CK2 may be a signal shifted in phase with respect to the first clock signal CK1 by half a period (i.e., half a cycle) of the first clock signal CK1.

In an embodiment, a level of the low voltage of each of the first clock signal CK1 and the second clock signal CK2 may be higher than the level of the first low gate voltage VGL, and a level of the high voltage of each of the first clock signal CK1 and the second clock signal CK2 may be equal to the level of the high gate voltage VGH. In an embodiment, the level of the low voltage of each of the first clock signal CK1 and the second clock signal CK2 may be equal to the level of the first low gate voltage VGL, and the level of the high voltage of each of the first clock signal CK1 and the second clock signal CK2 may be lower than the level of the high gate voltage VGH.

The gate driver 10 may include a plurality of stages . . . , ST[n−1], ST[n], . . . . Each of the stages . . . , ST[n−1], ST[n], . . . may receive the first clock signal CK1 or the second clock signal CK2 as a clock signal CLK. In an embodiment, each of odd-numbered stages . . . , ST[n−1], . . . may receive the first clock signal CK1 as the clock signal CLK, and each of even-numbered stages . . . , ST[n], . . . may receive the second clock signal CK2 as the clock signal CLK. Each of the stages . . . , ST[n−1], ST[n], . . . may receive a previous gate signal output from a previous stage as a first input signal IN1, and may receive a previous carry signal output from the previous stage as a second input signal IN2. The stages . . . , ST[n−1], ST[n], . . . may output the gate signals . . . , GS[n−1], GS[n], . . . as first output signals OUT1 and may output the carry signals . . . , CR[n−1], CR[n], . . . as second output signals OUT2.

Figure 2:
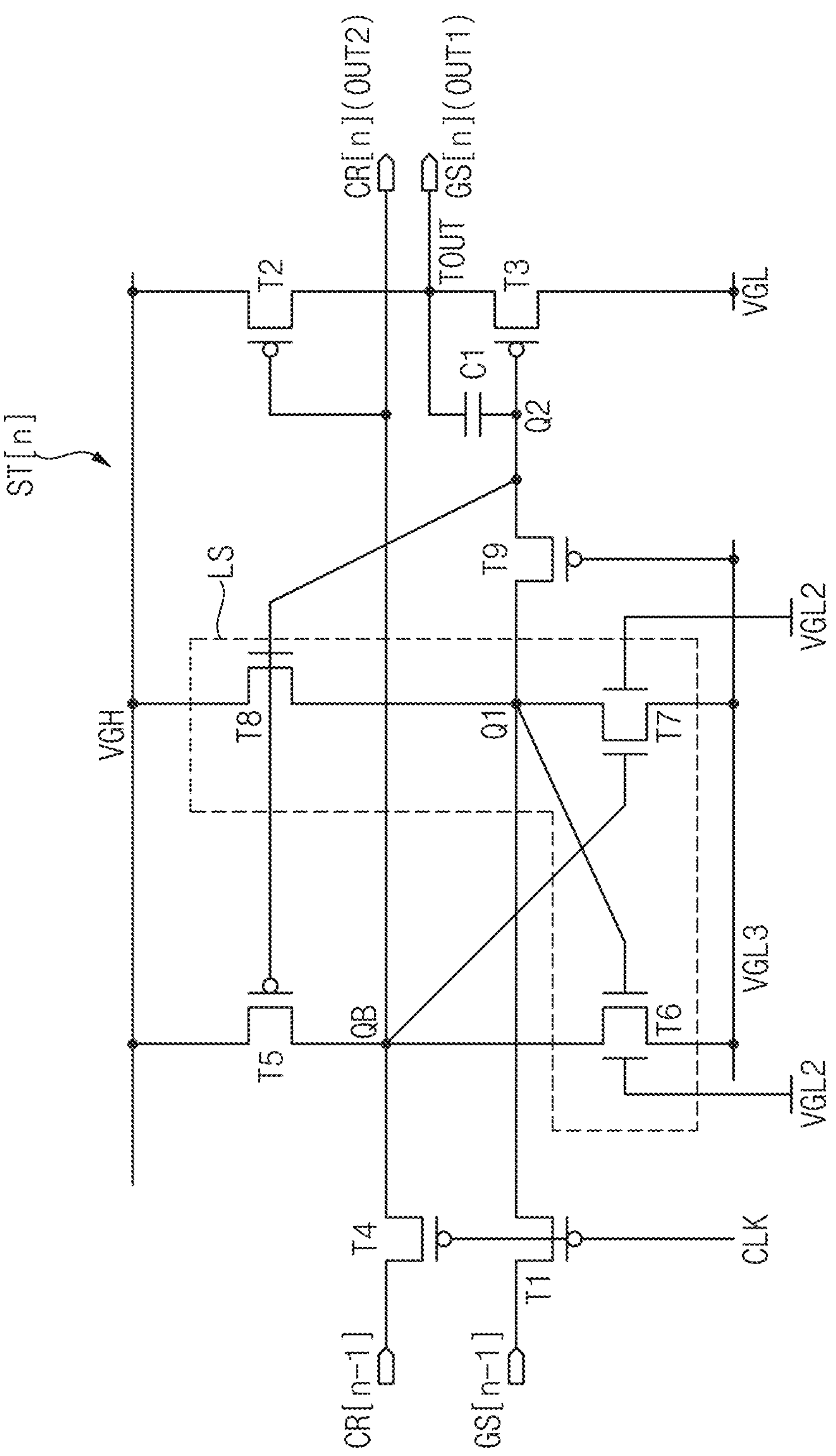
FIG. 2 is a circuit diagram showing an example of a stage of FIG. 1.

FIG. 2 is a circuit diagram showing an example of a stage ST[n] of FIG. 1.

Referring to FIGS. 1 and 2, the stage ST[n] may receive the first input signal IN1, the second input signal IN2, the clock signal CLK, the high gate voltage VGH, the first low gate voltage VGL, the second low gate voltage VGL2, and the third low gate voltage VGL3, and may output the first output signal OUT1 and the second output signal OUT2. The first input signal IN1 may be a previous gate signal GS[n−1] of a previous stage ST[n−1], the second input signal IN2 may be a previous carry signal CR[n−1] of the previous stage ST[n−1], the first output signal OUT1 may be a gate signal GS[n], and the second output signal OUT2 may be a carry signal CR[n].

The stage ST[n] may include a first transistor T1, a second transistor T2, a third transistor T3, a fourth transistor T4, a fifth transistor T5, a level shifter LS, a ninth transistor T9, and a first capacitor C1.

The first transistor T1 (exemplified as a PMOS in FIG. 2 with a circle at its gate) may transfer the previous gate signal GS[n−1] to a first control node Q1 in response to the clock signal CLK. In an embodiment, the first transistor T1 may include a gate that receives the clock signal CLK, a first terminal (e.g., a source) that receives the previous gate signal GS[n−1], and a second terminal (e.g., a drain) connected to the first control node Q1.

The second transistor T2 may output the high gate voltage VGH as the gate signal GS[n] in response to a signal of an inverting control node QB. In an embodiment, the second transistor T2 may include a gate connected to the inverting control node QB, a first terminal (e.g., a source) that receives the high gate voltage VGH, and a second terminal (e.g., a drain) connected to an output terminal TOUT that outputs the gate signal GS[n].

The third transistor T3 may include a gate connected to the second control node Q2, a first terminal (e.g., a source) that receives the first low gate voltage VGL, and a second terminal (e.g., a drain) connected to the output terminal TOUT. The third transistor T3 may output the first low gate voltage VGL at the output terminal TOUT as the gate signal GS[n] in response to a signal of a second control node Q2. To this end, the third transistor T3 may output VGL by transferring VGL across the first to second terminals thereof when it is turned on by a low voltage at its gate.

The level shifter LS may include a sixth transistor T6, a seventh transistor T7, and an eighth transistor T8. The level shifter LS may transfer the high gate voltage VGH or the third low gate voltage VGL3 to the first control node Q1 and the inverting control node QB in response to a signal of the first control node Q1, the signal of the second control node Q2, and the signal of the inverting control node QB. The level shifter LS may increase the amplitude of the signal at the first control node Q1, the amplitude of the signal at the second control node Q2, and the amplitude of the signal at the inverting control node QB, so that the amplitude of the signals at each of the first control node Q1, the second control node Q2, and the inverting control node QB are greater than the amplitude of the clock signal CLK. Accordingly, the amplitude of the clock signal CLK may decrease, and power consumption of the gate driver 10 may be reduced.

The sixth transistor T6 may transfer the third low gate voltage VGL3 to the inverting control node QB in response to the signal of the first control node Q1. The sixth transistor T6 may include a gate connected to the first control node Q1, a first terminal (e.g., a drain) that receives the third low gate voltage VGL3, and a second terminal (e.g., a source) connected to the inverting control node QB. The sixth transistor T6 may further include a back gate that receives the second low gate voltage VGL2. In this case, since a level of a signal VGL2 at the back gate of the sixth transistor T6 becomes lower than a level of a signal VGL3 at the first terminal of the sixth transistor T6 when the sixth transistor T6 is turned off, a leakage current through the sixth transistor T6 may decrease.

The seventh transistor T7 may transfer the third low gate voltage VGL3 to the first control node Q1 in response to the signal of the inverting control node QB. The seventh transistor T7 may include a gate connected to the inverting control node QB, a first terminal (e.g., a drain) that receives the third low gate voltage VGL3, and a second terminal (e.g., a source) connected to the first control node Q1. The seventh transistor T7 may further include a back gate that receives the second low gate voltage VGL2. In this case, since a level of a signal VGL2 at the back gate of the seventh transistor T7 becomes lower than a level of a signal VGL3 at the first terminal of the seventh transistor T7 when the seventh transistor T7 is turned off, a leakage current through the seventh transistor T7 may decrease.

The eighth transistor T8 may transfer the high gate voltage VGH to the first control node Q1 in response to the signal at the second control node Q2. The eighth transistor T8 may include a gate connected to the second control node Q2, a first terminal (e.g., a drain) that receives the high gate voltage VGH, and a second terminal (e.g., a source) connected to the first control node Q1.

When the high gate voltage VGH is applied to the second control node Q2, the eighth transistor T8 transfers the high gate voltage VGH to the first control node Q1 so that the high gate voltage VGH may be maintained at the first control node Q1.

When the third low gate voltage VGL3 is applied to the first control node Q1 and the second control node Q2, the third transistor T3 is turned on so that the gate signal GS[n] may change from the high gate voltage VGH to the first low gate voltage VGL. In this case, the signal at the second control node Q2 may be boosted by the first capacitor C1, and the signal at the second control node Q2 may have a level less than the level of the third low gate voltage VGL3. Since a threshold voltage of an NMOS transistor is close to 0 V, even if a gate-source voltage becomes approximately 0 V, the NMOS transistor may be turned on due to a deviation of the threshold voltage. When the gate of the eighth transistor T8, which is the NMOS transistor, is connected to the first control node Q1, the gate-source voltage of the eighth transistor T8 becomes approximately 0 V, so that the eighth transistor T8 may be turned on, and a malfunction of the gate driver 10 may occur due to the leakage current through the eighth transistor T8. However, in the present embodiment, the gate of the eighth transistor T8 is connected to the second control node Q2, and the gate-source voltage of the eighth transistor T8 is less than 0 V, so that the eighth transistor T8 may be turned off, and the leakage current through the eighth transistor T8 may not occur.

The fourth transistor T4 may transfer a signal of a previous inverting control node of the previous stage ST[n−1] to the inverting control node QB in response to the clock signal CLK. The signal of the previous inverting control node may be the previous carry signal CR[n−1]. In an embodiment, the fourth transistor T4 may include a gate that receives the clock signal CLK, a first terminal (e.g., a source) that receives the signal of the previous inverting control node, and a second terminal (e.g., a drain) connected to the inverting control node QB.

The fifth transistor T5 may include a gate connected to the second control node Q2, a first terminal (e.g., a source) that receives the high gate voltage VGH, and a second terminal (e.g., a drain) connected to the inverting control node QB. The fifth transistor T5 may transfer the high gate voltage VGH to the inverting control node QB in response to the signal at the first control node Q1 or the signal at the second control node Q2. The signal at the inverting control node QB may be output as the carry signal CR[n].

In an embodiment, the ninth transistor T9 may include a gate that receives the third low gate voltage VGL3, a first terminal (e.g., a source) connected to the first control node Q1, and a second terminal (e.g., a drain) connected to the second control node Q2. The ninth transistor T9 may be an always on transistor (AOT).

In an embodiment, each of the first transistor T1, the second transistor T2, the third transistor T3, the fourth transistor T4, the fifth transistor T5, and the ninth transistor T9 may be a PMOS transistor, and each of the sixth transistor T6, the seventh transistor T7, and the eighth transistor T8 may be an NMOS transistor.

The first capacitor C1 may include a first terminal connected to the output terminal TOUT and a second terminal connected to the second control node Q2. The first capacitor C1 may store the signal at the second control node Q2, and may boost the signal at the second control node Q2 in response to a change in the gate signal GS.

Figure 3:
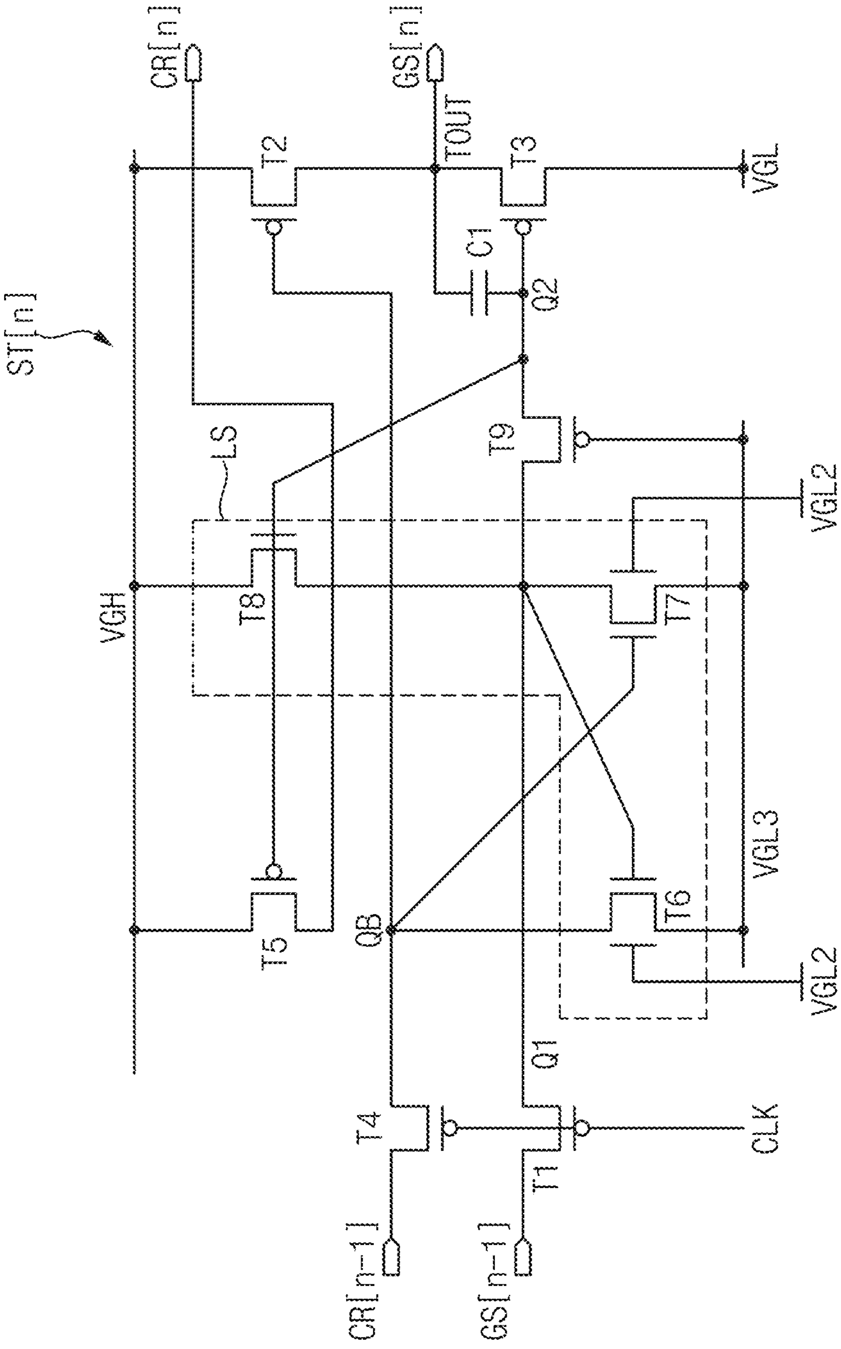
FIG. 3 is a circuit diagram showing a stage of a gate driver according to an embodiment.

FIG. 3 is a circuit diagram showing a stage ST[n] of a gate driver according to an embodiment. The embodiment of FIG. 3 differs from that of FIG. 2 in that the second terminal of the gate is not connected to the inverting control node QB but instead directly outputs the carry signal CR[n]. Thus, unlike the embodiment of FIG. 2, the carry signal CR[n] may not correspond to the signal at the inverting control node QB.

Descriptions of components of the stage ST[n] described with reference to FIG. 3, which are substantially the same as or similar to those of the stage ST[n] described with reference to FIG. 2, may be omitted.

Referring to FIG. 3, the fourth transistor T4 may transfer the previous carry signal CR[n−1] of the previous stage ST[n−1] to the inverting control node QB in response to the clock signal CLK. In an embodiment, the fourth transistor T4 may include a gate that receives the clock signal CLK, a first terminal (e.g., a source) that receives the previous carry signal CR[n−1], and a second terminal (e.g., a drain) connected to the inverting control node QB.

The fifth transistor T5 may transfer the high gate voltage VGH as the carry signal CR[n] in response to the signal at the first control node Q1 or the signal at the second control node Q2. In an embodiment, the fifth transistor T5 may include a gate connected to the second control node Q2, a first terminal (e.g., a source) that receives the high gate voltage VGH, and a second terminal (e.g., a drain) that outputs the carry signal CR[n].

Figure 4:
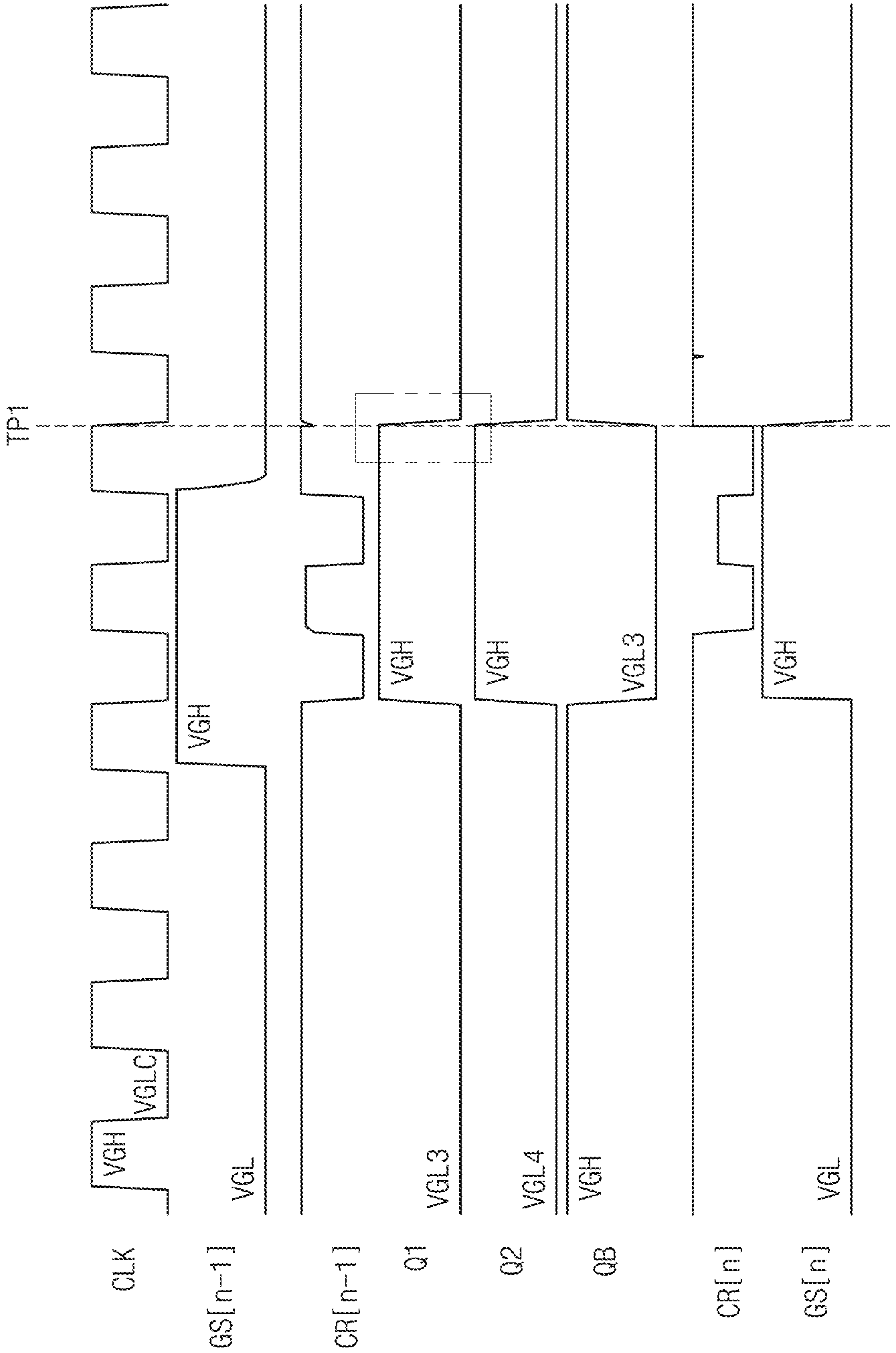
FIG. 4 is a timing diagram showing example signals of the stage of FIG. 3.

FIG. 4 is a timing diagram showing example signals of the stage ST[n] of FIG. 3.

Referring to FIGS. 3 and 4, the amplitude of the clock signal CLK (herein, "amplitude" is the difference between the low voltage level and the high voltage level) may be less than the amplitude of the signal at the first control node Q1, the amplitude of the signal at the second control node Q2, and the amplitude of the signal at the inverting control node QB. Each of the signal at the first control node Q1 and the signal at the inverting control node QB may swing between the third low gate voltage VGL3 and the high gate voltage VGH. The signal at the second control node Q2 may swing between a fourth low gate voltage VGL4 having a level lower than the level of the third low gate voltage VGL3 and the high gate voltage VGH. In an embodiment, the level of the low voltage VGLC of the clock signal CLK may be higher than the level of the first low gate voltage VGL, and the level of the high voltage of the clock signal CLK may be equal to the level of the high gate voltage VGH. For example, the level of the low voltage VGLC of the clock signal CLK may be about-4.5 V.

Figure 5:
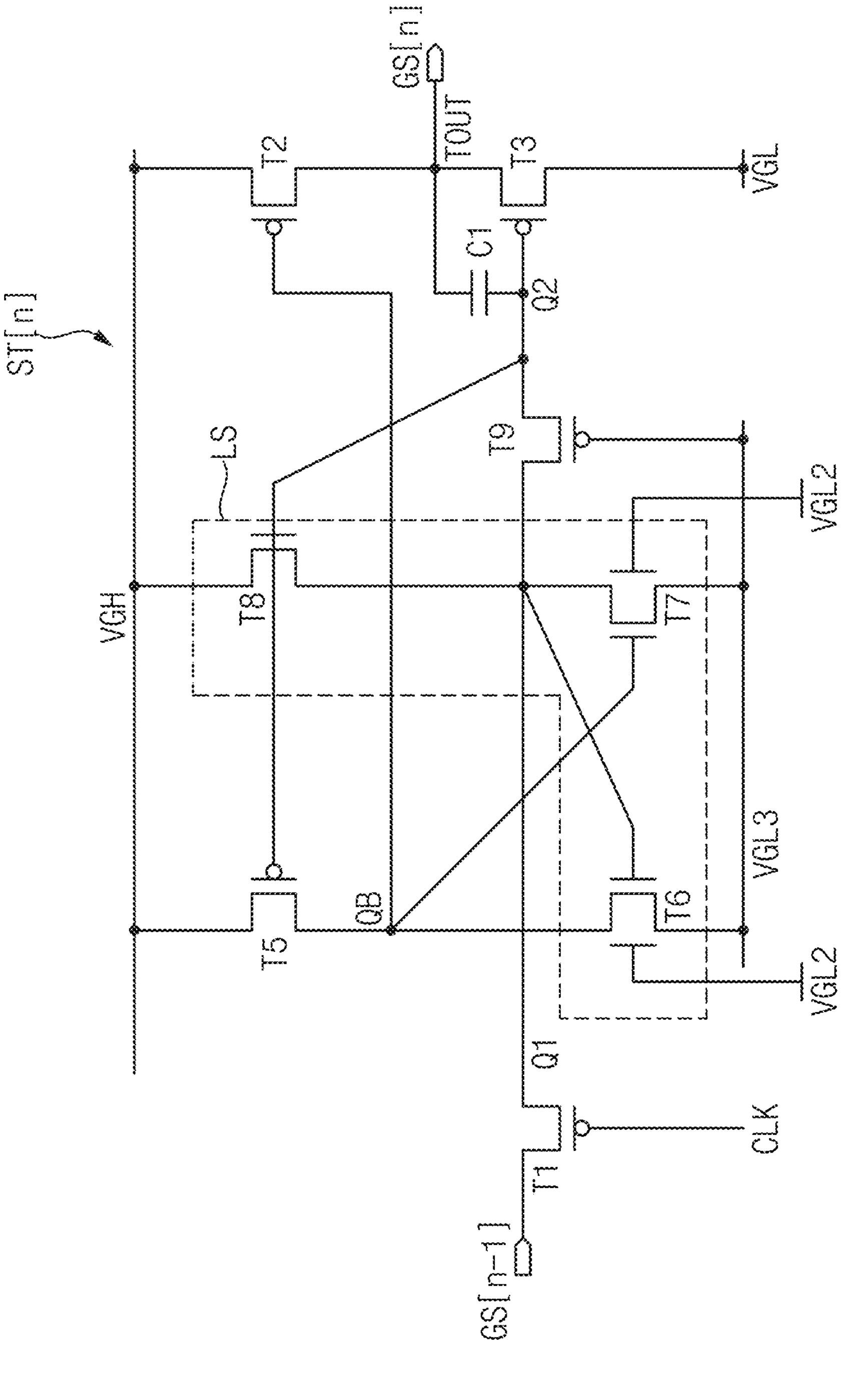
FIG. 5 is a circuit diagram showing a stage of a gate driver according to a comparative example.
Figure 6:
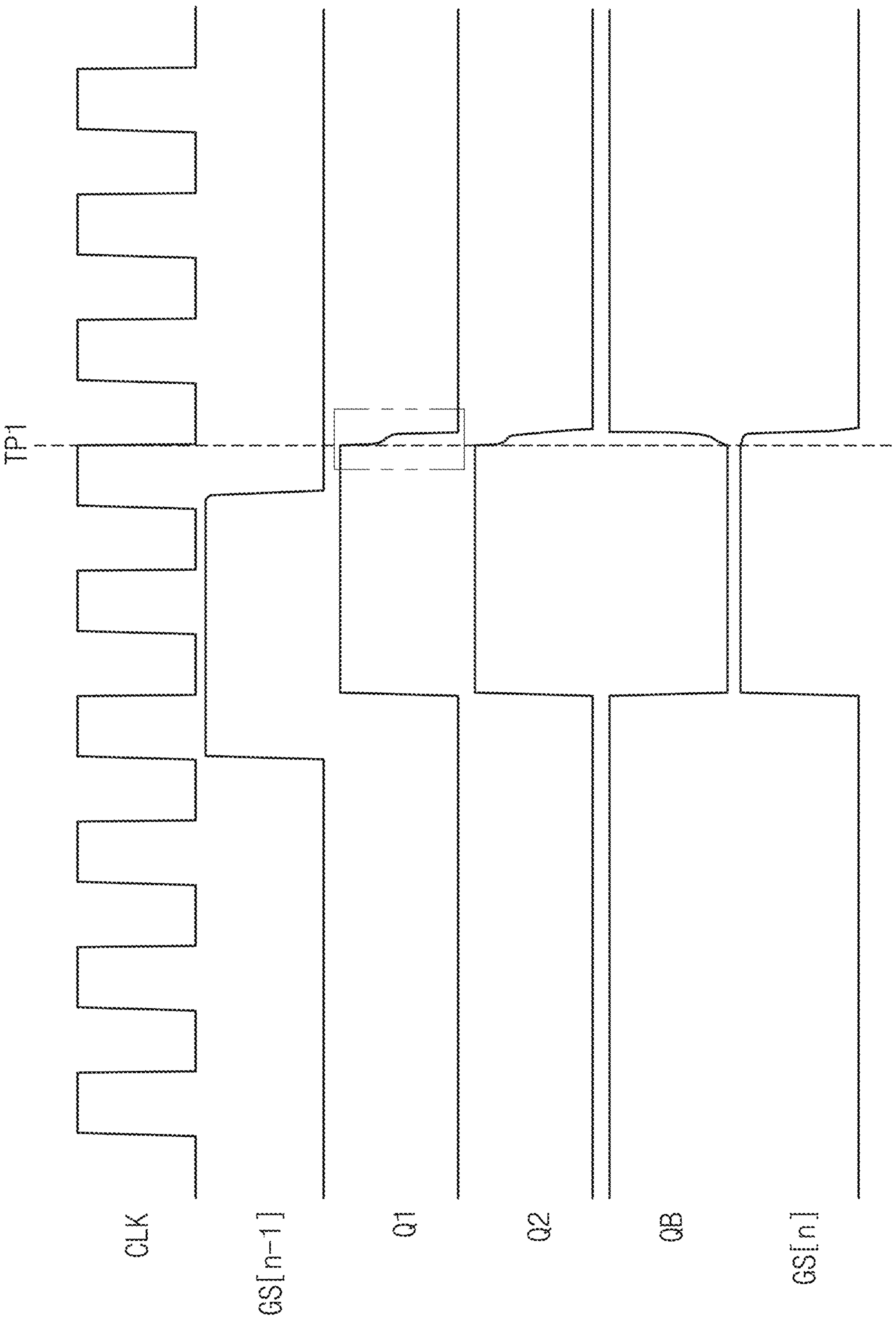
FIG. 6 is a timing diagram showing signals of the stage of FIG. 5.

FIG. 5 is a circuit diagram showing a stage ST[n] of a gate driver according to a comparative example. FIG. 6 is a timing diagram showing signals of the stage ST[n] of FIG. 5.

Referring to FIGS. 5 and 6, in the comparative example, the stage ST[n] may not include the fourth transistor T4, may not receive the previous carry signal CR[n−1], and may not output the carry signal CR[n].

In the comparative example, at a first time point TP1, the first transistor T1 may be turned on so that the first low gate voltage VGL may be applied to the first control node Q1 and the second control node Q2, the fifth transistor T5 may be turned on so that the high gate voltage VGH may be applied to the inverting control node QB, and the seventh transistor T7 may be turned on so that the third low gate voltage VGL3 may be applied to the first control node Q1 and the second control node Q2. The PMOS transistor may be turned on slowly when the threshold voltage of the PMOS transistor shifts negatively, and the first transistor T1 and/or the fifth transistor T5 may be turned on slowly, which may increase a rising transition time of the signal of the inverting control node QB, when the threshold voltage of the first transistor T1 and/or the fifth transistor T5, which are PMOS transistors, shifts negatively. (Hereafter, a rising transition time may be referred to as a “rise time”, which may be a time between 10-90% or other predetermined majority portion of the amplitude between the steady state low level and the steady state high level of the signal being discussed. Likewise, a falling transition time may be referred to as a fall time.) When the rise time of the signal at the inverting control node QB increases, the seventh transistor T7 may be turned on slowly, which may increase a fall time of the signals at the first control node Q1 and the second control node Q2. Accordingly, a fall time of the gate signal GS[n] may increase, and reliability of the gate driver may deteriorate.

In the present embodiment, as illustrated in FIGS. 3 and 4, at the first time point TP1, the fourth transistor T4 may be turned on so that the high gate voltage VGH may be applied to the inverting control node QB, and the seventh transistor T7 may be turned on so that the third low gate voltage VGL3 may be applied to the first control node Q1 and the second control node Q2. Since a gate-source voltage of the fourth transistor T4 is relatively large, the high gate voltage VGH may be quickly applied to the inverting control node QB, and the seventh transistor T7 may be quickly turned on so that the fall time of the signal at the first control node Q1 and the second control node Q2 may decrease. Accordingly, the fall time of the gate signal GS[n] may decrease, and the reliability of the gate driver 10 may be improved.

Figure 7:
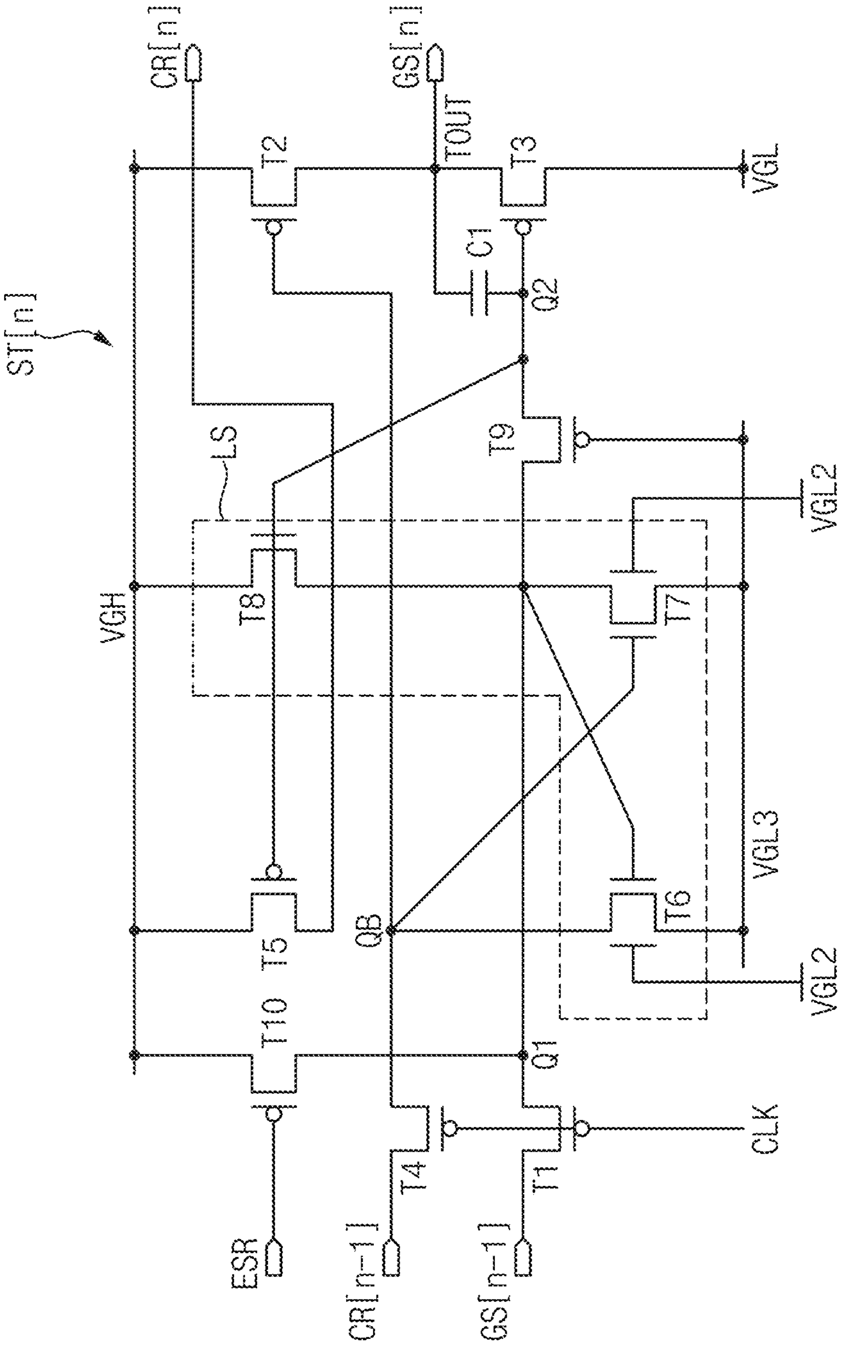
FIG. 7 is a circuit diagram showing a stage of a gate driver according to an embodiment.

FIG. 7 is a circuit diagram showing a stage ST[n] of a gate driver according to an embodiment.

Descriptions of components of the stage ST[n] described with reference to FIG. 7, which are substantially the same as or similar to those of the stages ST[n] described with reference to FIGS. 2 and 3, may be omitted.

Referring to FIG. 7, as compared to the embodiments of FIGS. 2 and 3, the stage ST[n] may further include a tenth transistor T10. The tenth transistor T10 may include a gate that receives a reset signal ESR, a first terminal (e.g., a source) that receives the high gate voltage VGH, and a second terminal (e.g., a drain) connected to the first control node Q1. The tenth transistor T10 may transfer the high gate voltage VGH to the first control node Q1 and the second control node Q2 in response to the reset signal ESR. When a display device including the gate driver is powered on, the reset signal ESR may have a pulse having a level of a gate-on voltage (a negative voltage for a PMOS transistor). While the display device is being driven, the reset signal ESR may have a gate-off voltage. Accordingly, when the display device is powered on, the high gate voltage VGH may be transferred to the first control node Q1 and the second control node Q2 (through the first to second terminals of the transistor T9), and the stage ST[n] may output the high gate voltage VGH as the gate signal GS[n].

Figure 8:
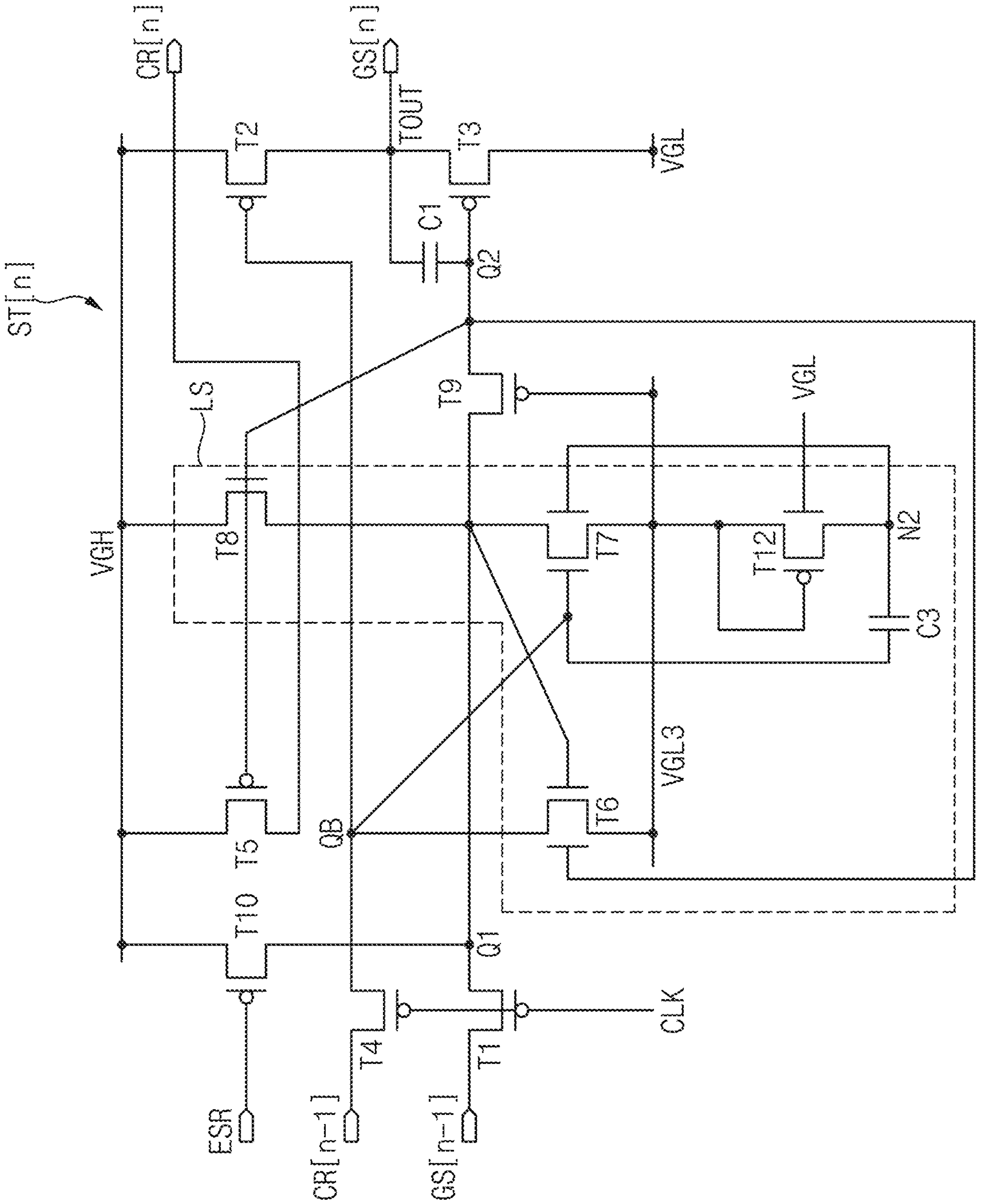
FIG. 8 is a circuit diagram showing a stage of a gate driver according to an embodiment.

FIG. 8 is a circuit diagram showing a stage ST[n] of a gate driver according to an embodiment.

Descriptions of components of the stage ST[n] described with reference to FIG. 8, which are substantially the same as or similar to those of the stages ST[n] described with reference to FIGS. 2, 3, and 7, may be omitted.

Referring to FIG. 8, the back gate of the sixth transistor T6 may be connected to the second control node Q2. When the third low gate voltage VGL3 is transferred to the first control node Q1 and the second control node Q2, the third transistor T3 may be turned on so that the gate signal GS[n] may change from the high gate voltage VGH to the first low gate voltage VGL. In this case, the signal at the second control node Q2 may be boosted by the first capacitor C1, and the signal VGL4 at the second control node Q2 may have a level lower than the level of the third low gate voltage VGL3. Accordingly, a level of a signal VGL4 at the back gate of the sixth transistor T6 may become lower than a level of a signal VGL3 at the first terminal of the sixth transistor T6 when the sixth transistor T6 is turned off, and a leakage current through the sixth transistor T6 may decrease.

The level shifter LS may further include a twelfth transistor T12 and a third capacitor C3.

The twelfth transistor T12 may include a gate that receives the third low gate voltage VGL3, a first terminal (e.g., a source) connected to the gate of the twelfth transistor T12, and a second terminal (e.g., a drain) connected to a second node N2. The twelfth transistor T12 may be diode-connected (i.e., its gate may be directly connected to its source). In an embodiment, the twelfth transistor T12 may further include a back gate that receives the first low gate voltage VGL.

The third capacitor C3 may include a first terminal connected to the inverting control node QB and a second terminal connected to the second node N2.

When the signal at the inverting control node QB increases from the third low gate voltage VGL3 to the high gate voltage VGH, a signal at the second node N2 may be maintained as the sum of the third low gate voltage VGL3 and a threshold voltage of the twelfth transistor T12 by the diode-connected twelfth transistor T12. When the signal at the inverting control node QB decreases from the high gate voltage VGH to the third low gate voltage VGL3, the coupling of the third capacitor C3 may cause the signal at the second node N2 to decrease. For example, the signal at the second node N2 may decrease from a level equal to the sum of the third low gate voltage VGL3 and the threshold voltage of the twelfth transistor T12. The amount of the decrease may equal a voltage corresponding to a decreased value of the signal of the inverting control node QB. Accordingly, a level of a signal at the back gate of the seventh transistor T7 may become lower than a level of a signal VGL3 at the first terminal of the seventh transistor T7 when the seventh transistor T7 is turned off, and a leakage current through the seventh transistor T7 may decrease.

Figure 9:
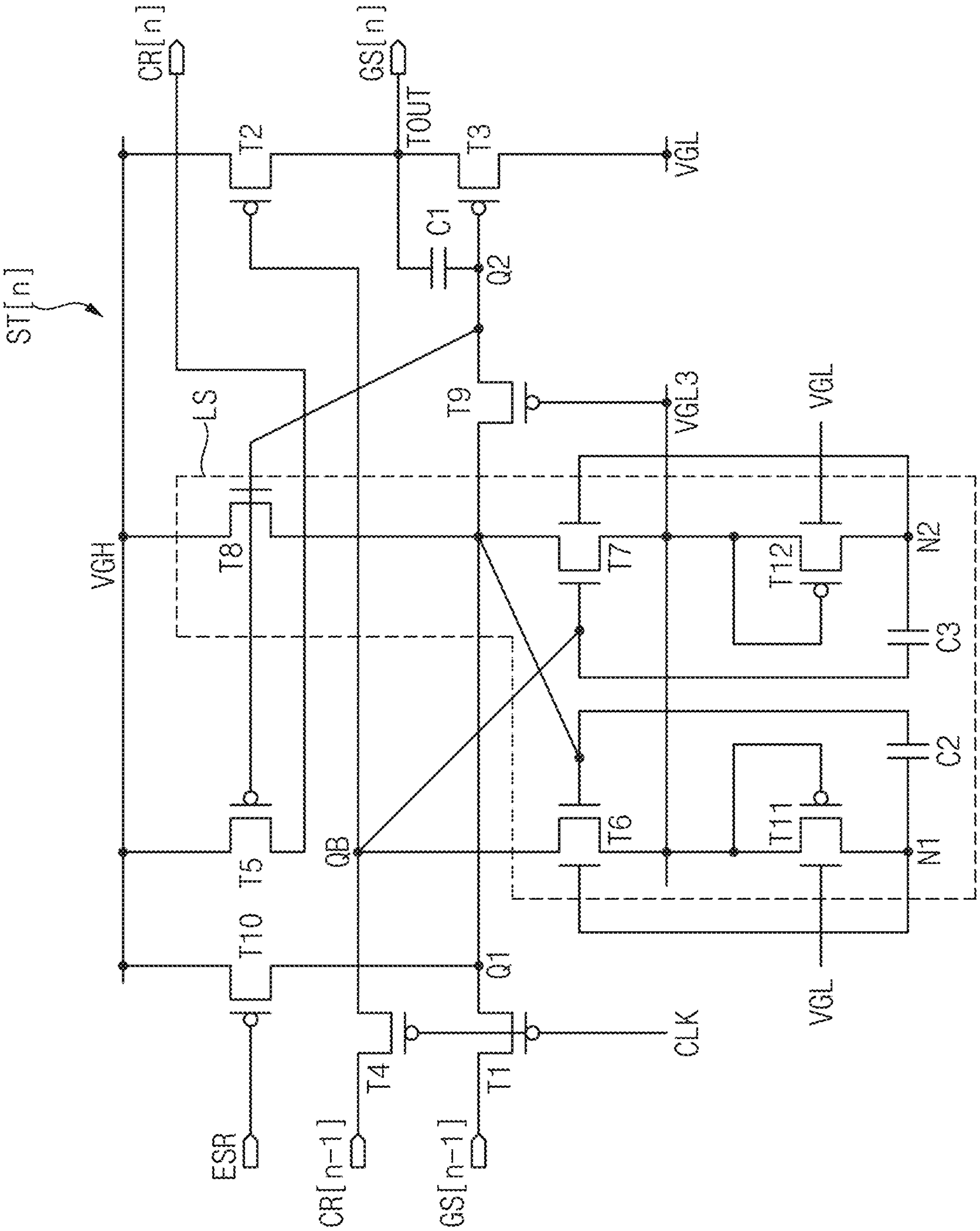
FIG. 9 is a circuit diagram showing a stage of a gate driver according to an embodiment.

FIG. 9 is a circuit diagram showing a stage ST[n] of a gate driver according to an embodiment.

Descriptions of components of the stage ST[n] described with reference to FIG. 9, which are substantially the same as or similar to those of the stages ST[n] described with reference to FIGS. 2, 3, 7, and 8, may be omitted.

Referring to FIG. 9, the level shifter LS may further include an eleventh transistor T11 and a second capacitor C2.

The eleventh transistor T11 may include a gate that receives the third low gate voltage VGL3, a first terminal (e.g., a source) connected to the gate of the eleventh transistor T11, and a second terminal (e.g., a drain) connected to a first node N1. The eleventh transistor T11 may be diode-connected (i.e., its gate may be directly connected to its source). In an embodiment, the eleventh transistor T11 may further include a back gate that receives the first low gate voltage VGL.

The second capacitor C2 may include a first terminal connected to the first control node Q1 and a second terminal connected to the first node N1.

Figure 10:
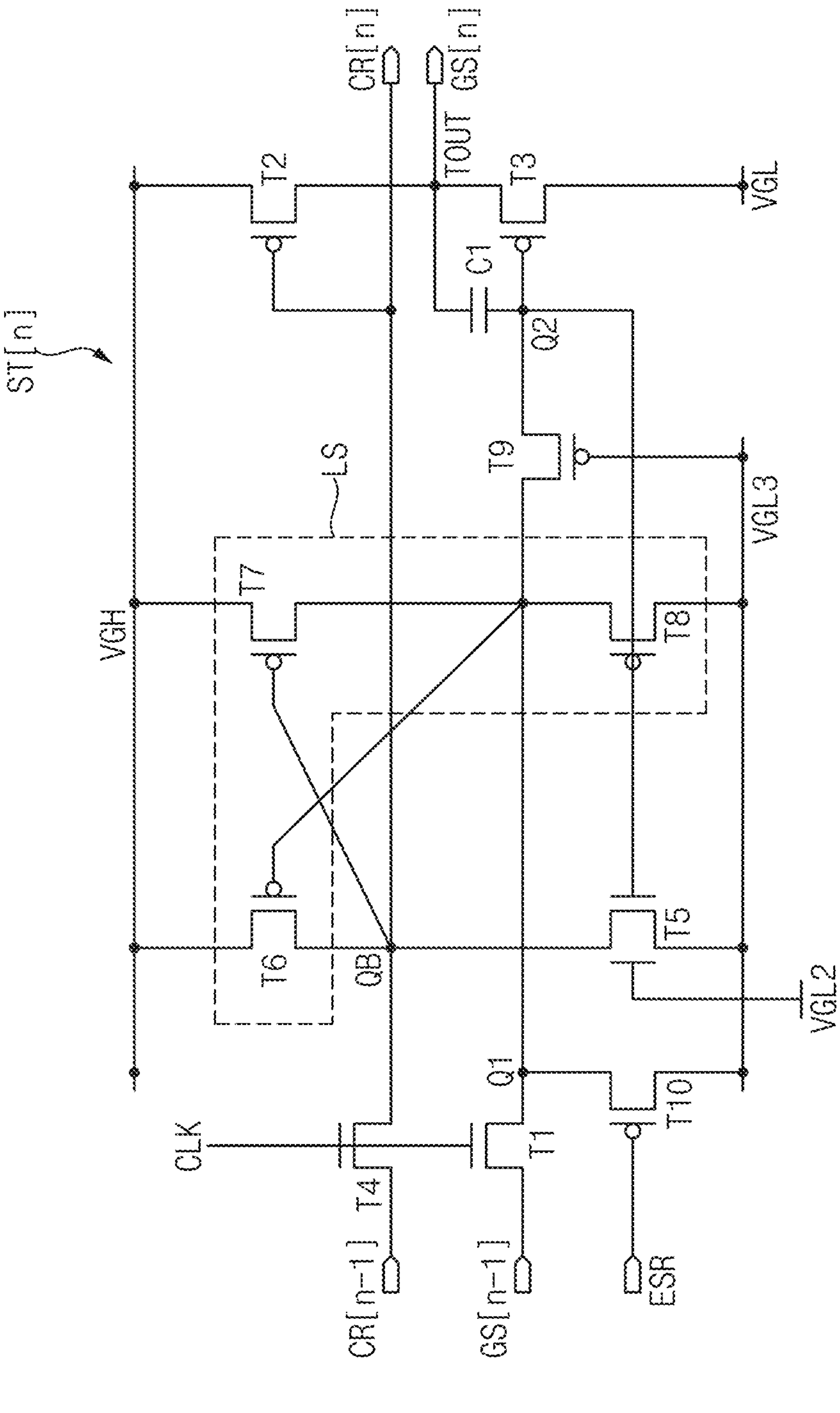
FIG. 10 is a circuit diagram showing a stage of a gate driver according to an embodiment.

When the signal at the first control node Q1 increases from the third low gate voltage VGL3 to the high gate voltage VGH, the signal at the first node N1 may be maintained as the sum of the third low gate voltage VGL3 and a threshold voltage of the eleventh transistor T11 by the diode-connected eleventh transistor T11. When the signal at the first control node Q1 decreases from the high gate voltage VGH to the third low gate voltage VGL3, the signal at the first node N1 may decrease due to the coupling of the second capacitor C2. The amount of the decrease may equal a voltage corresponding to a decreased value of the signal of the first control node Q1. Accordingly, a level of a signal of the back gate of the sixth transistor T6 may become lower than a level of a signal VGL3 of the first terminal of the sixth transistor T6 when the sixth transistor T6 is turned off, and a leakage current through the sixth transistor T6 may decrease. FIG. 10 is a circuit diagram showing a stage ST[n] of a gate driver according to an embodiment.

Descriptions of components of the stage ST[n] described with reference to FIG. 10, which are substantially the same as or similar to those of the stage ST[n] described with reference to FIG. 2, may be omitted.

Referring to FIG. 10, the first transistor T1 may transfer the previous gate signal GS[n−1] to the first control node Q1 in response to the clock signal CLK. The first transistor T1 may include a gate that receives the clock signal CLK, a first terminal (e.g., a drain) that receives the previous gate signal GS[n−1], and a second terminal (e.g., a source) connected to the first control node Q1.

The level shifter LS may include the sixth to eighth transistors T6-T8. The sixth transistor T6 may transfer the high gate voltage VGH to the inverting control node QB in response to the signal of the first control node Q1. The sixth transistor T6 may include a gate connected to the first control node Q1, a first terminal (e.g., a source) that receives the high gate voltage VGH, and a second terminal (e.g., a drain) connected to the inverting control node QB.

The seventh transistor T7 may transfer the high gate voltage VGH to the first control node Q1 in response to the signal of the inverting control node QB. The seventh transistor T7 may include a gate connected to the inverting control node QB, a first terminal (e.g., a source) that receives the high gate voltage VGH, and a second terminal (e.g., a drain) connected to the first control node Q1.

The eighth transistor T8 may transfer the third low gate voltage VGL3 to the first control node Q1 in response to the signal of the second control node Q2. The eighth transistor T8 may include a gate connected to the second control node Q2, a first terminal (e.g., a source) that receives the third low gate voltage VGL3, and a second terminal (e.g., a drain) connected to the first control node Q1.

When the third transistor T3 is turned on so that the gate signal GS[n] changes from the high gate voltage VGH to the first low gate voltage VGL, the signal at the second control node Q2 may be boosted by the first capacitor C1, and the signal at the second control node Q2 may have a level lower than the level of the third low gate voltage VGL3. In this case, since a gate-source voltage of the eighth transistor T8 is greater than 0 V, the eighth transistor T8 is turned on, so that the third low gate voltage VGL3 may be applied to the first control node Q1 through the eighth transistor T8.

The fourth transistor T4 may transfer the signal of the previous inverting control node of the previous stage ST[n−1] to the inverting control node QB in response to the clock signal CLK. The signal of the previous inverting control node may be the previous carry signal CR[n−1]. The fourth transistor T4 may include a gate that receives the clock signal CLK, a first terminal (e.g., a drain) that receives the signal of the previous inverting control node, and a second terminal (e.g., a source) connected to the inverting control node QB.

The fifth transistor T5 may transfer the third low gate voltage VGL3 to the inverting control node QB in response to the signal of the first control node Q1 and/or the signal of the second control node Q2. (The level at the second control node Q2 may equal the level at the first control node Q1 when the nineth transistor T9 is turned on.) The signal of the inverting control node QB may be output as the carry signal CR[n]. The fifth transistor T5 may include a gate connected to the second control node Q2, a first terminal (e.g., a drain) that receives the third low gate voltage VGL3, and a second terminal (e.g., a source) connected to the inverting control node QB.

Each of the second transistor T2, the third transistor T3, and the sixth to tenth transistors T6-T10 may be a PMOS transistor (as illustrated in FIG. 10 by the circles at the respective gates), and each of the first transistor T1, the fourth transistor T4, and the fifth transistor T5 may be an NMOS transistor (no circles at the gates).

The stage ST[n] may further include the tenth transistor T10. The tenth transistor T10 may transfer the third low gate voltage VGL3 to the first control node Q1 or the second control node Q2 in response to the reset signal ESR. The tenth transistor T10 may include a gate that receives the reset signal ESR, a first terminal (e.g., a source) that receives the third low gate voltage VGL3, and a second terminal (e.g., a drain) connected to the first control node Q1.

Figure 11:
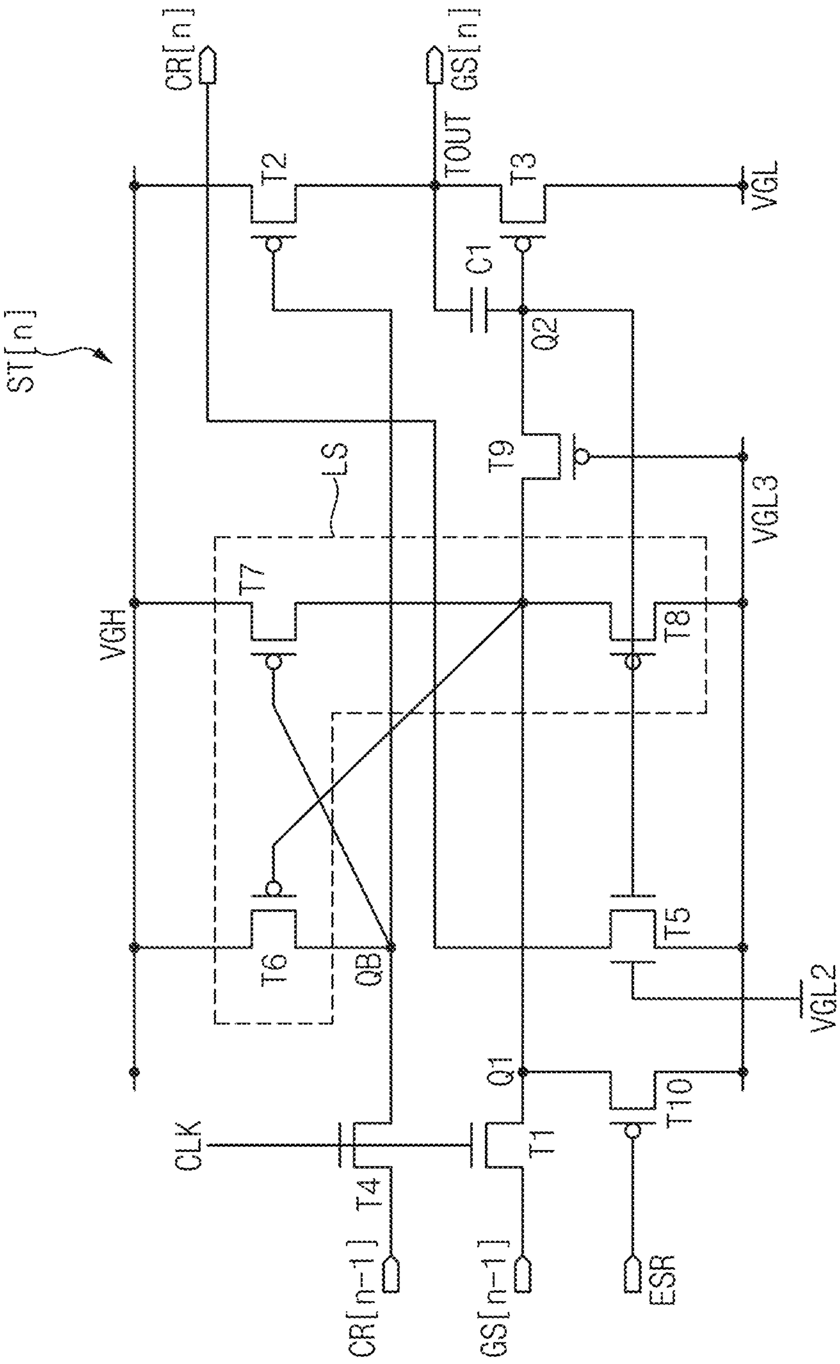
FIG. 11 is a circuit diagram showing a stage of a gate driver according to an embodiment.

FIG. 11 is a circuit diagram showing a stage ST[n] of a gate driver according to an embodiment.

Descriptions of components of the stage ST[n] described with reference to FIG. 11, which are substantially the same as or similar to those of the stages ST[n] described with reference to FIGS. 2 and 3, may be omitted.

Referring to FIG. 11, the fourth transistor T4 may transfer the previous carry signal CR[n−1] of the previous stage ST[n−1] to the inverting control node QB in response to the clock signal CLK. The fourth transistor T4 may include a gate that receives the clock signal CLK, a first terminal (e.g., a drain) that receives the previous carry signal CR[n−1], and a second terminal (e.g., a source) connected to the inverting control node QB.

The fifth transistor T5 may transfer the third low gate voltage VGL3 as the carry signal CR[n] in response to the signal at the first control node Q1 and/or the signal at the second control node Q2. The fifth transistor T5 may include a gate connected to the second control node Q2, a first terminal (e.g., a drain) that receives the third low gate voltage VGL3, and a second terminal (e.g., a source) configured to output the carry signal CR[n]. The fifth transistor T5 may further include a back gate that receives the second low gate voltage VGL2. In this case, a level of a signal VGL2 at the back gate of the fifth transistor T5 may become lower than a level of a signal VGL3 at the first terminal of the fifth transistor T5 when the fifth transistor T5 is turned off, so that a leakage current through the fifth transistor T5 may decrease.

Figure 12:
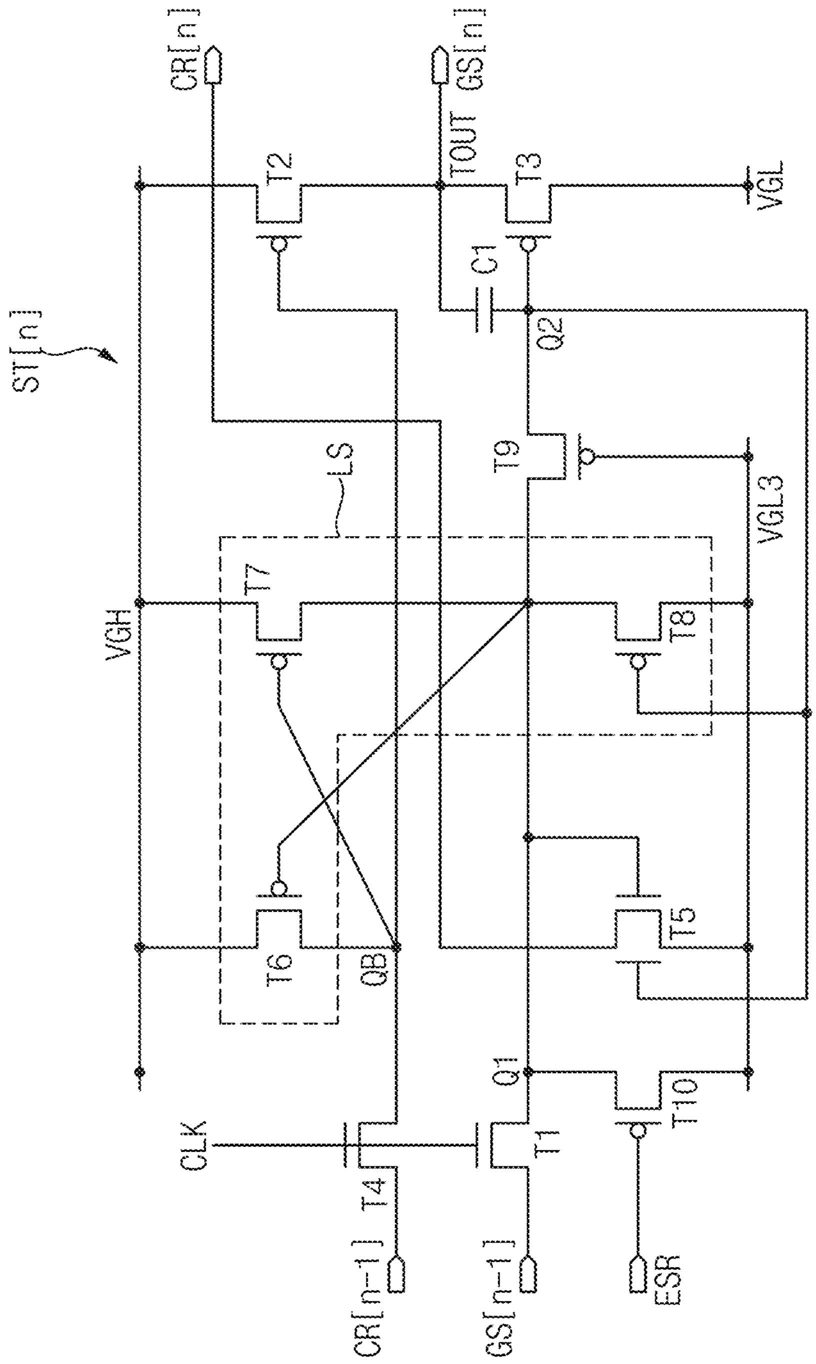
FIG. 12 is a circuit diagram showing a stage of a gate driver according to an embodiment.

FIG. 12 is a circuit diagram showing a stage ST[n] of a gate driver according to an embodiment.

Descriptions of components of the stage ST[n] described with reference to FIG. 12, which are substantially the same as or similar to those of the stages ST[n] described with reference to FIGS. 2, 10, and 11, may be omitted.

Referring to FIG. 12, the fifth transistor T5 may transfer the third low gate voltage VGL3 as the carry signal CR[n] in response to the signal at the first control node Q1. The fifth transistor T5 may include a gate connected to the first control node Q1, a first terminal (e.g., a drain) that receives the third low gate voltage VGL3, and a second terminal (e.g., a source) configured to output the carry signal CR[n]. The fifth transistor T5 may further include a back gate connected to the second control node Q2. When the third low gate voltage VGL3 is transferred to the first control node Q1 and the second control node Q2, the third transistor T3 may be turned on so that the gate signal GS[n] may change from the high gate voltage VGH to the first low gate voltage VGL. In this case, the signal at the second control node Q2 may be boosted by the first capacitor C1, and the signal VGL4 at the second control node Q2 may have a level lower than the level of the third low gate voltage VGL3. Accordingly, a level of a signal VGL4 at the back gate of the fifth transistor T5 may become lower than a level of a signal VGL3 at the first terminal of the fifth transistor T5 when the fifth transistor T5 is turned off, and a leakage current through the fifth transistor T5 may decrease.

Figure 13:
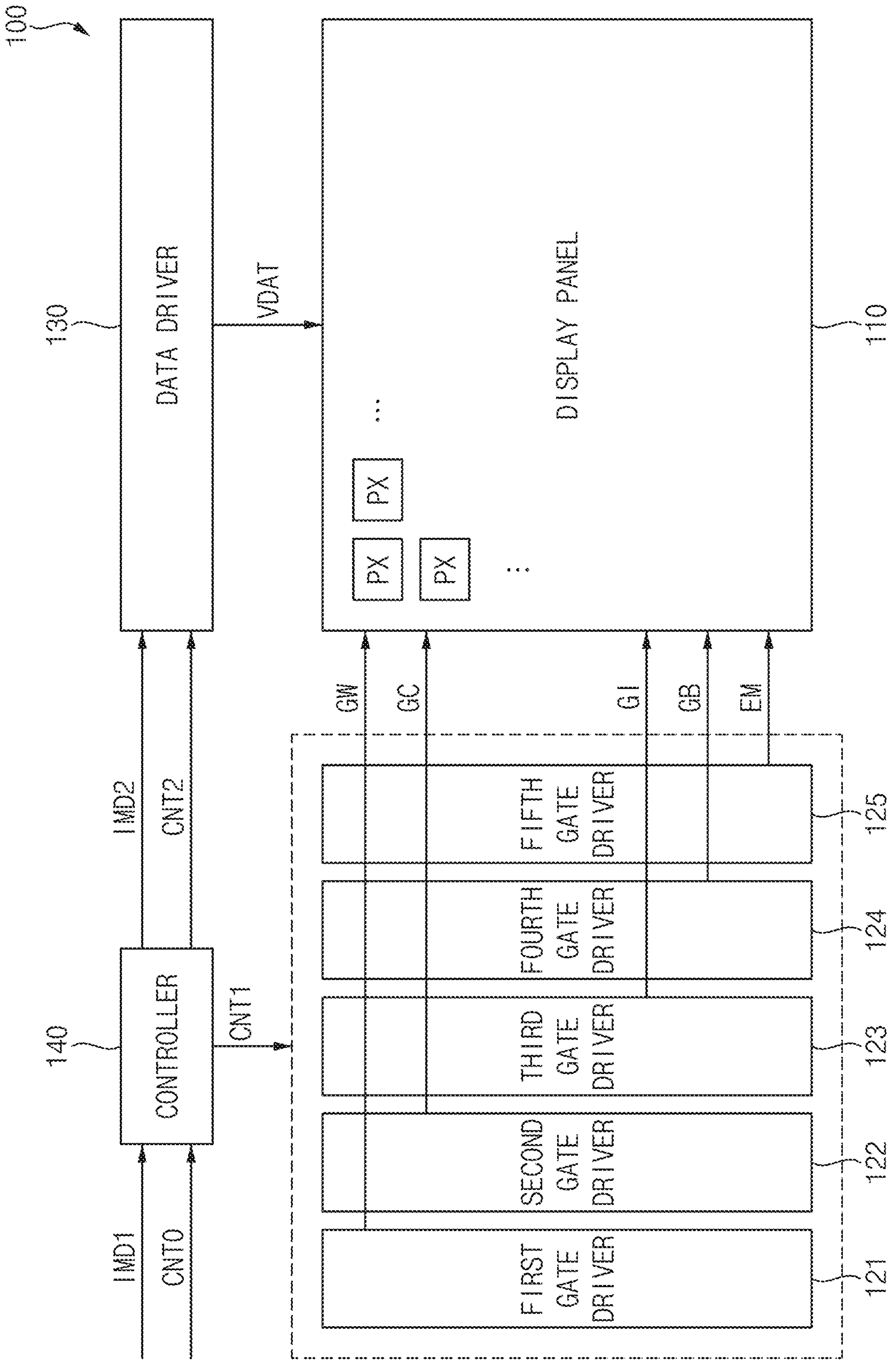
FIG. 13 is a block diagram showing a display device according to an embodiment.

FIG. 13 is a block diagram showing a display device 100 according to an embodiment.

Referring to FIG. 13, the display device 100 may include a display panel 110, a first gate driver 121, a second gate driver 122, a third gate driver 123, a fourth gate driver 124, a fifth gate driver 125, a data driver 130, and a controller 140.

The display panel 110 may include pixels PX. Each of the pixels PX may emit light based on a writing gate signal GW, a compensation gate signal GW, an initialization gate signal GI, a bypass gate signal GB, an emission signal EM, and a data voltage VDAT.

The first gate driver 121 may provide writing gate signals GW to the pixels PX. The second gate driver 122 may provide compensation gate signals GC to the pixels PX. The third gate driver 123 may provide initialization gate signals GI to the pixels PX. The fourth gate driver 124 may provide bypass gate signals GB to the pixels PX. The fifth gate driver 125 may provide emission signals EM to the pixels PX. The first to fifth gate drivers 121, 122, 123, 124, and 125 may generate the writing gate signals GW, the compensation gate signals GC, the initialization gate signals GI, the bypass gate signals GB, and the emission signals EM based on a first control signal CNT1. The first control signal CNT1 may include gate start signals, gate clock signals, etc.

In an embodiment, the gate driver 10 of FIG. 1 may correspond to one of the second gate driver 122, the third gate driver 123, and the fifth gate driver 125.

FIG. 13 illustrates an embodiment in which the display device 100 includes the first to fifth gate drivers 121-125, but the present disclosure is not limited thereto. In another embodiment, the display device 100 may include a gate driver in which the second gate driver 122 and the third gate driver 123 are integrated.

The data driver 130 may provide data voltages VDAT to the pixels PX. The data driver 130 may generate the data voltages VDAT based on second image data IMD2 and a second control signal CNT2. The second control signal CNT2 may include an output data enable signal, a horizontal start signal, a load signal, etc.

The controller 140 may control an operation (or driving) of the first to fifth gate drivers 121-125 and an operation (or driving) of the data driver 130. The controller 140 may output the first control signal CNT1 to the first to fifth gate drivers 121-125 and may output the second image data IMD2 and the second control signal CNT2 to the data driver 130. The controller 140 may generate the first control signal CNT1, the second image data IMD2, and the second control signal CNT2 based on first image data IMD1 and a control signal CNT0. The control signal CNT0 may include a master clock signal, a vertical start signal, a horizontal start signal, an input data enable signal, etc.

Figure 14:
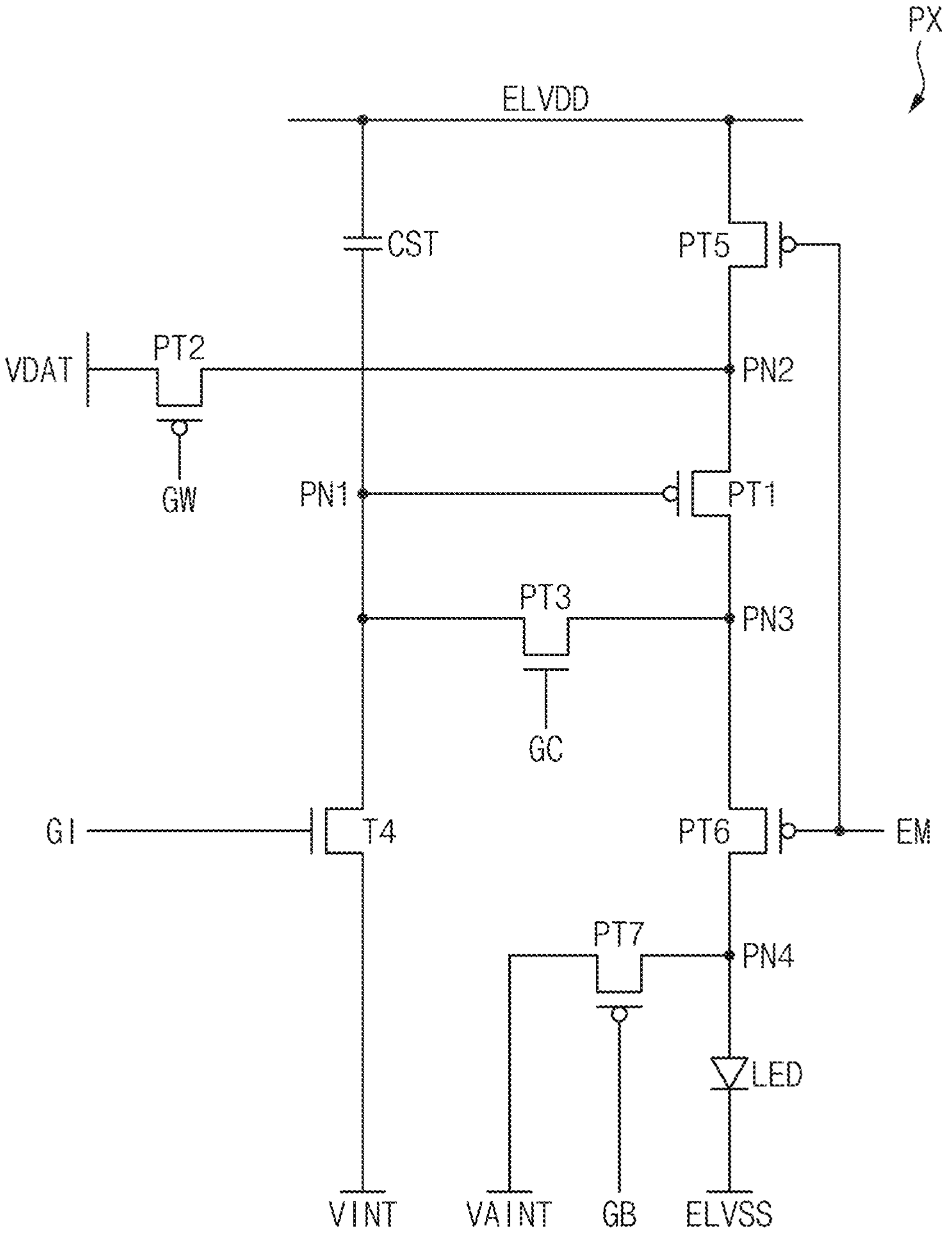
FIG. 14 is a circuit diagram showing an example of a pixel of FIG. 13.

FIG. 14 is a circuit diagram showing an example of a pixel PX of FIG. 13.

Referring to FIGS. 13 and 14, the pixel PX may receive the writing gate signal GW, the compensation gate signal GC, the initialization gate signal GI, the bypass gate signal GB, the emission signal EM, the data voltage VDAT, a first initialization voltage VINT, a second initialization voltage VAINT, a first power voltage ELVDD, and a second power voltage ELVSS.

The pixel PX may include a light-emitting element LED, a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, and a storage capacitor CST.

The light-emitting element LED may emit light with a luminance corresponding to a driving current. The light-emitting element LED may include an anode connected to a fourth pixel node PN4 and a cathode that receives the second power voltage ELVSS.

The first pixel transistor PT1 may control the driving current flowing to the light-emitting element LED. The first pixel transistor PT1 may include a gate connected to a first pixel node PN1, a first terminal (e.g., source) connected to a second pixel node PN2, and a second terminal (e.g., drain) connected to a third pixel node PN3.

The second pixel transistor PT2 may transfer the data voltage VDAT to the gate of the first pixel transistor PT1 in response to the writing gate signal GW. The second pixel transistor PT2 may include a gate that receives the writing gate signal GW, a first terminal (e.g., source) that receives the data voltage VDAT, and a second terminal (e.g., drain) connected to the second pixel node PN2.

The third pixel transistor PT3 may compensate a threshold voltage of the first pixel transistor PT1 in response to the compensation gate signal GC. The third pixel transistor PT3 may include a gate that receives the compensation gate signal GC, a first terminal (e.g., a drain) connected to the third pixel node PN3, and a second terminal (e.g., a source) connected to the first pixel node PN1.

The fourth pixel transistor PT4 may transfer the first initialization voltage VINT to the gate of the first pixel transistor PT1 in response to the initialization gate signal GI. The fourth pixel transistor PT4 may include a gate that receives the initialization gate signal GI, a first terminal (e.g., a drain) that receives the first initialization voltage VINT, and a second terminal (e.g., a source) connected to the first pixel node PN1.

The fifth pixel transistor PT5 may block a connection between the first terminal of the first pixel transistor PT1 and the first power voltage ELVDD in response to the emission signal EM. In an embodiment, the fifth pixel transistor PT5 may include a gate that receives the emission signal EM, a first terminal (e.g., a source) that receives the first power voltage ELVDD, and a second terminal (e.g., a drain) connected to the second pixel node PN2.

The sixth pixel transistor PT6 may block a connection between the second terminal of the first pixel transistor PT1 and the second power voltage ELVSS in response to the emission signal EM. The sixth pixel transistor PT6 may include a gate that receives the emission signal EM, a first terminal (e.g., a source) connected to the third pixel node PN3, and a second terminal (e.g., a drain) connected to the fourth pixel node PN4.

The seventh pixel transistor PT7 may provide the second initialization voltage VAINT to the anode of the light emitting element LED in response to the bypass gate signal GB. The seventh pixel transistor PT7 may include a gate that receives the bypass gate signal GB, a first terminal (e.g., a source) that receives the second initialization voltage VAINT, and a second terminal (e.g., a drain) connected to the fourth pixel node PN4.

As illustrated in FIG. 14, each of the first pixel transistor PT1, the second pixel transistor PT2, the fifth pixel transistor PT5, the sixth pixel transistor PT6, and the seventh pixel transistor PT7 may be a PMOS transistor, and each of the third pixel transistor PT3 and the fourth pixel transistor PT4 may be an NMOS transistor.

The storage capacitor CST may store a signal of the gate of the first pixel transistor PT1. The storage capacitor CST may include a first terminal connected to the first pixel node PN1 and a second terminal that receives the first power voltage ELVDD.

In an embodiment, each of the gate signals GS[n] of FIGS. 2, 3, 7, 8, 9, 10, 11, and 12 may be one of the compensation gate signal GC, the initialization gate signal GI, and the emission signal EM.

Figure 15:
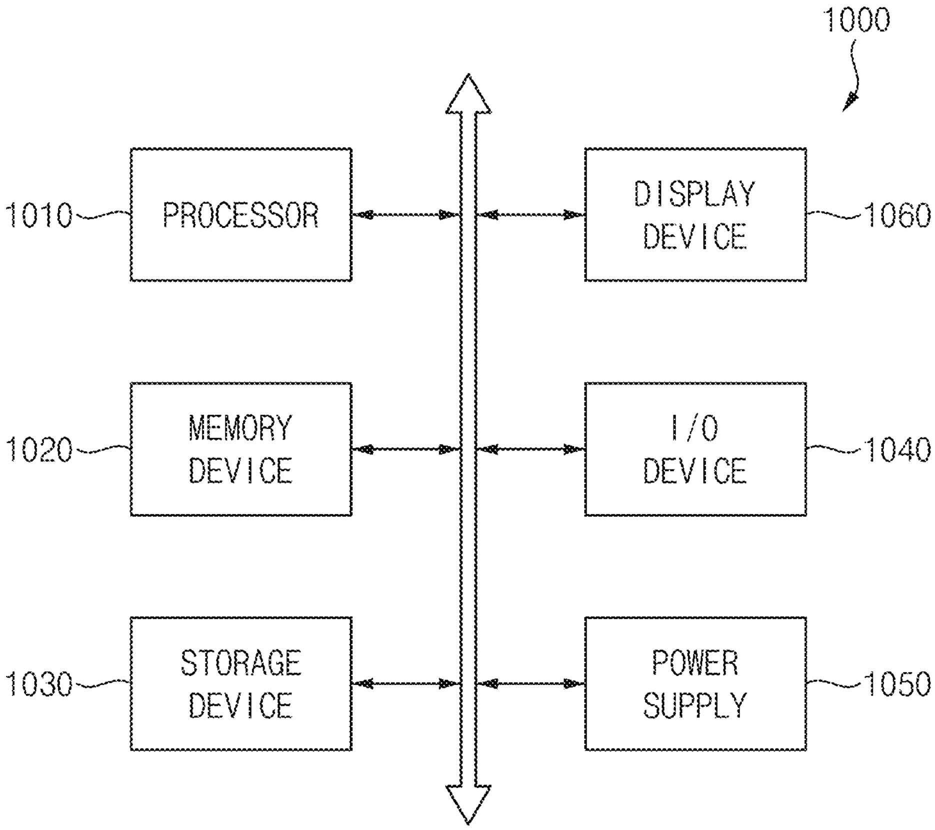
FIG. 15 is a block diagram showing an electronic apparatus according to an embodiment.

FIG. 15 is a block diagram showing an electronic device 1000 according to an embodiment.

Referring to FIG. 15, the electronic device 1000 may include a processor 1010, a memory device 1020, a storage device 1030, an input/output (I/O) device 1040, a power supply 1050, and a display device 1060. The electronic device 1000 may further include a plurality of ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be connected to an expansion bus such as a peripheral component interconnect (PCI) bus. In an embodiment, the processor 1010 may provide the first image data IMD1 of FIG. 13, the control signal CNT0 of FIG. 13, etc. to the display device 1060. In an embodiment, the processor 1010 may generate a control signal (e.g., the first control signal CNT1 of FIG. 13) that is provided to a gate driver of the display device 1060 and includes clock signal, etc.

The processor 1010 may include a main processor and an auxiliary or coprocessor. The main processor may include a central processing unit (CPU). The main processor may further include one or more of a graphics processing unit (GPU), a communication processor (CP), and an image signal processor (ISP). The coprocessor may include a controller. The controller may include an interface conversion circuit and a timing control circuit. The controller may receive an image signal from the main processor, convert the data format of the image signal to match the interface specifications with the display device 1060, and output image data. The controller may output various control signals to drive the display device 1060. For example, the controller may drive the display device 1060 to display the icon on the display screen suitable for selection by a user to cause execution of an application program.

The I/O device 1040 serves as the interaction medium between a user and the electronic device 1000. The I/O device 1040 may detect an input by a part (e.g., finger) of a user's body or an input by a pen or a mouse, and generate an electric signal or data value corresponding to the input. The I/O device 1040 may include a fingerprint sensor, an input sensor, and a digitizer (all not shown). The fingerprint sensor may sense a fingerprint for biometric recognition of the user and may also measure one or more biological signals such as blood pressure, moisture, or body mass. The input sensor may sense user interactions including touch, tap, gesture, motion, spoken command, and eye movement. The input sensor includes optical sensors for image capture, eye tracking, or motion and gesture detection. Optical sensors may be infrared or semiconductor photodetectors. The input sensor includes audio and acoustic sensors, which may be MEMS microphones for voice recognition or sound-based interaction. The audio and acoustic sensors can be installed as part of the I/O device 1040 or embedded in the display panel of the display device 1060. The digitizer may generate a data value corresponding to coordinate information of input by a pen or a mouse to control movement of an onscreen cursor. The digitizer may generate the amount of change in electromagnetic energy due to the input as the data value. The digitizer may detect an input by a passive pen or transmit and receive data with an active pen or a remote.

At least one of the fingerprint sensor, the input sensor, or the digitizer may be implemented as a sensor layer formed on the top layer of a display panel of the display device 1060 through a continuous process with a process of forming elements (for example, the light emitting element, the transistor, and the like) included in the display panel.

In addition, the I/O device 1040 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

A touch screen of the I/O device 1040 may include touch sensors embedded in semiconductor layers of the display panel to sense pressure applied to the top layer (screen) of the display panel. The touch sensors can be a capacitive or a resistive type. The touch screen may serve as the primary interface for the user to select and navigate applications, control, and interact with the electronic device 1000.

The display panel of the display device 1060 may include a liquid crystal display panel, an organic light emitting display panel, or an inorganic light emitting display panel, and the type of the display panel is not particularly limited. The display panel may be of a rigid type or a flexible type that can be rolled or folded. The display device 1060 may further include a supporter, bracket, heat dissipation member, and the like that support the display panel.

The power supply 1050 may supply power to the components of the electronic device 1000. The power supply 1050 may include a battery that charges the power source voltage. The battery may include a non-rechargeable primary battery or a rechargeable secondary battery or fuel cell. The power supply 1050 may include a power management integrated circuit (PMIC). The PMIC may supply optimized power source to each of the components described above including the display device 1060.

The memory device 1020 may store data required for an operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

In some embodiments, the memory device 1020 may store information such as software codes for operating an application program. The application program may include a software designed to execute specific tasks or provide functionality to a user. The application program may operate under the control of the processor 1010 and may utilize data stored in the memory device 1020 to deliver a wide range of features, such as productivity tools, multimedia streaming and playback, file or mail deliveries or communication services. The application program may interact seamlessly with the I/O device 1040 (e.g., a user interface or touch screen), allowing a user to launch, navigate, and utilize the program through user inputs such as touch, tap, gesture, or voice interaction. Upon user selection of an application via a touch screen or user interface, the processor 1010 may execute the application program corresponding to the selected application retrieved from the memory device 1020 to perform functionalities of the application. For example, when a user selects a camera application by tapping the icon (or a camera application icon) presented on the display device 1060, the processor 1010 activates a camera module. The processor 1010 may transmit image data corresponding to a captured image acquired through the camera module to the display device 10600. The display device 1060 may display an image corresponding to the captured image through a display panel thereof.

As another example, when a user wishes to make a phone call, the user taps the telephone icon displayed on the display device 1060, the processor 1010 may execute a phone application program stored in the memory device 1020. A telephone keypad may be presented on the display device 1060 for the user to enter a phone number to call.

As another example, the display device 1060 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply power required for the operation of the electronic device 1000. The display device 1060 may display an image. The display device 1060 may be connected to other components through the buses or other communication links. The display device 1060 may correspond to the display device 100 of FIG. 13.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 may be an AR/VR headset.

In a gate driver included in the display device 1060, a previous carry signal (or a signal of a previous inverting control node) of a previous stage is transferred to an inverting control node of a stage, so that a fall time of a signal of a first control node may decrease. Accordingly, a fall time of a gate signal may decrease, and reliability of the gate driver may be improved. Further, the display device 1060 includes the gate driver with the improved reliability, so that display quality of the display device 1060 may be improved.

Although the gate driver, the display device, and the electronic device according to the embodiments have been described with reference to the drawings, the shown embodiments are examples, and may be modified and changed by a person having ordinary knowledge in the relevant technical field without departing from the scope of the inventive concept and the technical spirit set forth in the following claims.

What is claimed is:

1. A gate driver including a plurality of stages, each of the stages comprising:

- a first transistor configured to transfer an input signal to a first control node in response to a clock signal;
- a second transistor configured to output a high gate voltage as a gate signal in response to a signal at an inverting control node;
- a third transistor configured to output a first low gate voltage as the gate signal in response to a signal at a second control node;
- a level shifter configured to transfer the high gate voltage or a third low gate voltage to the first control node and the inverting control node in response to a signal at the first control node, the signal at the second control node, and the signal at the inverting control node;
- a fourth transistor configured to transfer a previous carry signal of a previous stage to the inverting control node in response to the clock signal; and a fifth transistor configured to output the high gate voltage or the third low gate voltage as a carry signal in response to the signal at the first control node or the signal at the second control node.

2. The gate driver of claim 1, wherein an amplitude of the clock signal between a low voltage level and a high voltage level thereof is less than an amplitude of the signal at the first control node, an amplitude of the signal at the second control node, and an amplitude of the signal at the inverting control node.

3. The gate driver of claim 2, wherein the low voltage level of the clock signal is higher than a level of the first low gate voltage.

4. The gate driver of claim 1, wherein a level of the third low gate voltage is less than or equal to a level of the first low gate voltage.

5. The gate driver of claim 1, wherein each of the plurality of stages further comprises:

a ninth transistor including a gate that receives the third low gate voltage, a first terminal connected to the first control node, and a second terminal connected to the second control node.

6. The gate driver of claim 1, wherein each of the stages further comprises:

a first capacitor including a first terminal connected to an output terminal which outputs the gate signal and a second terminal connected to the second control node.

7. The gate driver of claim 1, wherein each of the stages further comprises:

a tenth transistor to transfer the high gate voltage or the third low gate voltage to the first control node or the second control node in response to a reset signal.

8. The gate driver of claim 1, wherein the level shifter includes:

a sixth transistor configured to output the third low gate voltage to the inverting control node in response to the signal at the first control node;

a seventh transistor configured to output the third low gate voltage to the first control node in response to the signal at the inverting control node; and an eighth transistor configured to output the high gate voltage to the first control node in response to the signal at the second control node.

9. The gate driver of claim 8, wherein the sixth transistor includes a back gate which receives a second low gate voltage having a level lower than a level of the third low gate voltage.

10. The gate driver of claim 8, wherein the sixth transistor includes a back gate connected to the second control node.

11. The gate driver of claim 8, wherein the level shifter further includes:

an eleventh transistor including a gate which receives the third low gate voltage, a first terminal connected to the gate, and a second terminal connected to a first node; and a second capacitor including a first terminal connected to the first control node and a second terminal connected to the first node, wherein the sixth transistor includes a back gate connected to the first node.

12. The gate driver of claim 1, wherein the level shifter includes:

a sixth transistor configured to output the high gate voltage to the inverting control node in response to the signal of the first control node;

a seventh transistor configured to output the high gate voltage to the first control node in response to the signal of the inverting control node; and an eighth transistor configured to output the third low gate voltage to the first control node in response to the signal of the second control node.

13. The gate driver of claim 1, wherein the fifth transistor includes a gate connected to the first control node and a back gate connected to the second control node.

14. A gate driver including a plurality of stages, each of the stages comprising:

a first transistor configured to transfer an input signal to a first control node in response to a clock signal;

a second transistor configured to output a high gate voltage as a gate signal in response to a signal at an inverting control node;

a third transistor configured to output a first low gate voltage as the gate signal in response to a signal at a second control node;

a level shifter configured to transfer the high gate voltage or a third low gate voltage to the first control node and the inverting control node in response to a signal at the first control node, the signal at the second control node, and the signal at the inverting control node;

a fourth transistor configured to transfer a signal of a previous inverting control node of a previous stage to the inverting control node in response to the clock signal; and a fifth transistor which outputs the high gate voltage or the third low gate voltage to the inverting control node in response to the signal at the first control node or the signal at the second control node.

15. The gate driver of claim 14, wherein an amplitude of the clock signal is less than an amplitude of the signal at the first control node, an amplitude of the signal at the second control node, and an amplitude of the signal at the inverting control node.

16. The gate driver of claim 14, wherein the level shifter includes:

a sixth transistor configured to output the third low gate voltage to the inverting control node in response to the signal at the first control node;

a seventh transistor configured to output the third low gate voltage to the first control node in response to the signal at the inverting control node; and an eighth transistor configured to output the high gate voltage to the first control node in response to the signal at the second control node.

17. The gate driver of claim 14, wherein the level shifter includes:

a sixth transistor configured to output the high gate voltage to the inverting control node in response to the signal at the first control node;

a seventh transistor configured to output the high gate voltage to the first control node in response to the signal at the inverting control node; and an eighth transistor configured to output the third low gate voltage to the first control node in response to the signal at the second control node.

18. An electronic device comprising:

a display device which displays an image;

a processor configured to provide image data to the display device; and a power supply configured to provide power to the display device and the processor, wherein the display device comprises:

a display panel including a plurality of pixels;

a gate driver including a plurality of stages which provide a plurality of gate signals to the pixels; and a data driver which provide a plurality of data voltages to the pixels, and wherein each of the stages comprises:

a first transistor configured to transfer an input signal to a first control node in response to a clock signal;

a second transistor configured to output a high gate voltage as a gate signal of the gate signals in response to a signal of an inverting control node;

a third transistor configured to output a first low gate voltage as the gate signal in response to a signal of a second control node;

a level shifter configured to transfer the high gate voltage or a third low gate voltage to the first control node and the inverting control node in response to a signal of the first control node, the signal of the second control node, and the signal of the inverting control node;

a fourth transistor configured to transfer a previous carry signal of a previous stage to the inverting control node in response to the clock signal; and a fifth transistor configured to output the high gate voltage or the third low gate voltage as a carry signal in response to the signal of the first control node or the signal of the second control node.

19. The electronic device of claim 18, wherein each of the pixels includes:

a light-emitting element;

a first pixel transistor configured to control a driving current which flows to the light-emitting element;

a second pixel transistor configured to transfer a data voltage of the data voltages to a gate of the first pixel transistor in response to a writing gate signal;

a third pixel transistor configured to compensate a threshold voltage of the first pixel transistor in response to a compensation gate signal;

a fourth pixel transistor configured to transfer a first initialization voltage to the gate of the first pixel transistor in response to an initialization gate signal;

a fifth pixel transistor configured to block a connection between a first terminal of the first pixel transistor and a first power voltage in response to an emission signal;

a sixth pixel transistor configured to block a connection between a second terminal of the first pixel transistor and a second power voltage in response to the emission signal;

a seventh pixel transistor configured to provide a second initialization voltage to an anode of the light-emitting element in response to a bypass gate signal; and a storage capacitor configured to store a signal of the gate of the first pixel transistor.

20. The electronic device of claim 19, wherein the gate signal is one of the compensation gate signal, the initialization gate signal, and the emission signal.

* * * * *